(12) United States Patent
Cappelle

(10) Patent No.: US 9,670,682 B2
(45) Date of Patent: Jun. 6, 2017

(54) PANEL, COVERING AND METHOD FOR INSTALLING SUCH PANELS

(71) Applicant: FLOORING INDUSTRIES LIMITED, SARL, Bertrange (LU)

(72) Inventor: Mark Cappelle, Staden (BE)

(73) Assignee: FLOORING INDUSTRIES LIMITED, SARL, Bertrange (LU)

(*) Notice: Subject to any disclaimer, the term of this patent is extended or adjusted under 35 U.S.C. 154(b) by 0 days.

(21) Appl. No.: 15/207,685

(22) Filed: Jul. 12, 2016

(65) Prior Publication Data

US 2016/0356047 A1  Dec. 8, 2016

Related U.S. Application Data

(63) Continuation of application No. 13/518,112, filed as application No. PCT/IB2010/055693 on Dec. 9, 2010.

(Continued)

(51) Int. Cl.
| | | |
|---|---|---|
| *E04F 15/10* | (2006.01) | |
| *E04F 15/02* | (2006.01) | |
| *B32B 3/06* | (2006.01) | |

(52) U.S. Cl.
CPC .............. *E04F 15/107* (2013.01); *B32B 3/06* (2013.01); *E04F 15/02038* (2013.01);
(Continued)

(58) Field of Classification Search
CPC . E04F 15/107; E04F 15/02038; E04F 15/105; B32B 3/06; B32B 2471/00
See application file for complete search history.

(56) References Cited

U.S. PATENT DOCUMENTS

| | | |
|---|---|---|
| 1,387,011 A | 8/1921 | Ratcliff |
| 1,448,180 A | 3/1923 | Atwood et al. |
| | (Continued) | |

FOREIGN PATENT DOCUMENTS

| | | |
|---|---|---|
| CA | 1 237 344 A1 | 5/1988 |
| CA | 2 734 801 A1 | 3/2010 |
| | (Continued) | |

OTHER PUBLICATIONS

Chang, Wen-Hsuan et al., Product Review: "Advances in Polyurethane Coatings (1969 to Early 1972)", Industrial & Engineering Chemistry Product Research & Development, vol. 12, No. 4, pp. 278-288, Sep. 7, 1973.

(Continued)

*Primary Examiner* — Jeanette E Chapman
(74) *Attorney, Agent, or Firm* — Workman Nydegger

(57) ABSTRACT

A panel for forming a covering, more particularly a floor panel for forming a floor covering, which at least at two opposite edges, comprises coupling parts arranged to couple two of such panels to each other by means of a downward movement of one panel in respect to the other. The coupling parts form a first locking system arranged to lock in the plane of the panels and perpendicularly to the edges, as well as form a second locking system, which effects a locking perpendicularly to the plane of the panels. At least one of the coupling parts is formed at least partially in soft PVC (polyvinyl chloride), as well as at least partially formed from a milled profiled part of this soft PVC.

12 Claims, 11 Drawing Sheets

Related U.S. Application Data

(60) Provisional application No. 61/333,510, filed on May 11, 2010.

(52) U.S. Cl.
CPC ...... *E04F 15/02194* (2013.01); *E04F 15/105* (2013.01); *B32B 2471/00* (2013.01); *E04F 2201/0123* (2013.01); *E04F 2201/0138* (2013.01); *E04F 2201/0146* (2013.01); *E04F 2201/0153* (2013.01)

(56) References Cited

U.S. PATENT DOCUMENTS

| | | | |
|---|---|---|---|
| 1,921,164 A | 8/1933 | Lewis | |
| 1,971,067 A | 8/1934 | Fess | |
| 2,143,220 A | 1/1939 | Cheney | |
| 3,173,804 A | 3/1965 | Standfuss | |
| 3,434,861 A | 3/1969 | Luc | |
| 3,554,827 A | 1/1971 | Yamagishi | |
| 3,741,851 A | 6/1973 | Erb et al. | |
| 3,810,774 A | 5/1974 | Pittman | |
| 3,811,915 A | 5/1974 | Burrell et al. | |
| 3,853,685 A | 12/1974 | Friedrich et al. | |
| 3,905,849 A | 9/1975 | Bomboire | |
| 4,050,409 A | 9/1977 | Duchenaud et al. | |
| 4,097,635 A | 6/1978 | Sanz Hernandez et al. | |
| 4,233,343 A | 11/1980 | Barker et al. | |
| 4,312,686 A | 1/1982 | Smith et al. | |
| 4,379,198 A | 4/1983 | Jaeschke et al. | |
| 4,396,566 A | 8/1983 | Brinkmann et al. | |
| 4,397,896 A | 8/1983 | Moran | |
| 4,400,862 A | 8/1983 | Ignell | |
| 4,426,820 A | 1/1984 | Terbrack et al. | |
| 4,614,680 A | 9/1986 | Fry et al. | |
| 4,690,434 A | 9/1987 | Schmidt | |
| 4,844,763 A | 7/1989 | Robbins | |
| 4,948,653 A | 8/1990 | Dinter et al. | |
| 5,077,112 A | 12/1991 | Hensel et al. | |
| 5,082,495 A | 1/1992 | Iijima | |
| 5,112,671 A | 5/1992 | Diamond et al. | |
| 5,261,508 A | 11/1993 | Kikuchi | |
| 5,275,862 A | 1/1994 | Ramadan et al. | |
| 5,437,934 A | 8/1995 | Witt et al. | |
| 5,516,472 A | 5/1996 | Laver | |
| 5,560,797 A | 10/1996 | Burt et al. | |
| 5,836,128 A | 11/1998 | Groh et al. | |
| 5,863,632 A | 1/1999 | Bisker | |
| 5,899,038 A | 5/1999 | Stroppiana | |
| 5,916,662 A | 6/1999 | Schmidt | |
| 5,952,076 A | 9/1999 | Foster | |
| 5,988,503 A | 11/1999 | Kuo | |
| 6,256,959 B1 | 7/2001 | Palmersten | |
| 6,306,318 B1 | 10/2001 | Ricciardelli et al. | |
| 6,333,094 B1 | 12/2001 | Schneider et al. | |
| 6,345,481 B1 | 2/2002 | Nelson | |
| 6,444,075 B1 | 9/2002 | Schneider et al. | |
| 6,477,948 B1 | 11/2002 | Nissing et al. | |
| 6,591,568 B1 | 7/2003 | Paisson | |
| 6,617,009 B1 | 9/2003 | Chen et al. | |
| 6,647,690 B1 | 11/2003 | Martensson | |
| 6,772,568 B2 | 8/2004 | Thiers et al. | |
| 6,804,926 B1 | 10/2004 | Eisermann | |
| 6,931,811 B2 | 8/2005 | Thiers | |
| 6,933,043 B1 | 8/2005 | Son et al. | |
| 6,979,487 B2 | 12/2005 | Scarbrough et al. | |
| 6,991,830 B1 | 1/2006 | Hansson et al. | |
| 7,093,399 B2 * | 8/2006 | Thiers | E04F 15/02 52/578 |
| 7,169,460 B1 | 1/2007 | Chen et al. | |
| 7,243,469 B2 | 7/2007 | Miller et al. | |
| 7,516,588 B2 | 4/2009 | Pervan | |
| 7,596,920 B2 | 10/2009 | Konstanczak | |
| 7,762,035 B2 | 7/2010 | Cappelle | |
| 8,056,236 B2 | 11/2011 | Brouckaert et al. | |
| 8,153,234 B2 | 4/2012 | Nollet et al. | |
| 8,156,705 B2 | 4/2012 | Alford et al. | |
| 8,245,477 B2 | 8/2012 | Pervan | |
| 8,272,187 B2 | 9/2012 | Meersseman et al. | |
| 8,375,672 B2 | 2/2013 | Hannig | |
| 8,465,804 B2 | 6/2013 | Provoost et al. | |
| 8,475,871 B2 | 7/2013 | Oldorff | |
| 2001/0034991 A1 | 11/2001 | Martensson et al. | |
| 2002/0020127 A1 | 2/2002 | Thiers et al. | |
| 2002/0056245 A1 | 5/2002 | Thiers | |
| 2002/0092252 A1 | 7/2002 | Kettler et al. | |
| 2002/0092263 A1 | 7/2002 | Schulte | |
| 2002/0136862 A1 | 9/2002 | Dong et al. | |
| 2002/0142106 A1 | 10/2002 | Bethune et al. | |
| 2002/0189183 A1 | 12/2002 | Ricciardelli | |
| 2003/0033777 A1 | 2/2003 | Thiers et al. | |
| 2003/0033779 A1 | 2/2003 | Downey | |
| 2003/0097808 A1 | 5/2003 | Sabatini | |
| 2003/0101674 A1 * | 6/2003 | Pervan | E04C 2/20 52/592.1 |
| 2003/0159385 A1 | 8/2003 | Thiers | |
| 2004/0016197 A1 | 1/2004 | Ruhdorfer | |
| 2004/0026017 A1 | 2/2004 | Taylor et al. | |
| 2004/0071978 A1 | 4/2004 | Hallenbeck et al. | |
| 2004/0102120 A1 | 5/2004 | Plusquellec et al. | |
| 2004/0103602 A1 | 6/2004 | Geraud | |
| 2004/0137248 A1 | 7/2004 | Elsasser | |
| 2004/0139678 A1 | 7/2004 | Pervan | |
| 2004/0146695 A1 | 7/2004 | Hardwick | |
| 2004/0161588 A1 | 8/2004 | Mauk et al. | |
| 2004/0191547 A1 | 9/2004 | Oldorff | |
| 2004/0255538 A1 | 12/2004 | Ruhdorfer | |
| 2005/0025934 A1 | 2/2005 | Thiers | |
| 2005/0050827 A1 * | 3/2005 | Schitter | B44C 5/043 52/578 |
| 2005/0153243 A1 | 7/2005 | Rundle et al. | |
| 2005/0221056 A1 | 10/2005 | Schwonke et al. | |
| 2005/0281986 A1 | 12/2005 | Nam | |
| 2006/0008630 A1 | 1/2006 | Thiers et al. | |
| 2006/0032175 A1 | 2/2006 | Chen et al. | |
| 2006/0032177 A1 | 2/2006 | Moriau et al. | |
| 2006/0179773 A1 * | 8/2006 | Pervan | B27N 7/00 52/592.1 |
| 2006/0204773 A1 | 9/2006 | Kwon et al. | |
| 2006/0280870 A1 | 12/2006 | Halot et al. | |
| 2007/0051064 A1 | 3/2007 | Thiers | |
| 2007/0094978 A1 | 5/2007 | Svanholm et al. | |
| 2007/0175160 A1 | 8/2007 | Groeke et al. | |
| 2007/0251188 A1 | 11/2007 | Moriau et al. | |
| 2008/0005999 A1 | 1/2008 | Pervan | |
| 2008/0029926 A1 | 2/2008 | Steinwender et al. | |
| 2008/0034701 A1 | 2/2008 | Pervan | |
| 2008/0060308 A1 | 3/2008 | Pervan | |
| 2008/0138560 A1 | 6/2008 | Windmoller | |
| 2008/0168737 A1 | 7/2008 | Pervan | |
| 2008/0172856 A1 | 7/2008 | Brouckaert et al. | |
| 2008/0305312 A1 | 12/2008 | Kim et al. | |
| 2008/0311355 A1 | 12/2008 | Chen et al. | |
| 2009/0019801 A1 | 1/2009 | Coghlan et al. | |
| 2009/0031662 A1 | 2/2009 | Chen et al. | |
| 2009/0042010 A1 | 2/2009 | Stanhope | |
| 2009/0260307 A1 | 10/2009 | Thiers | |
| 2009/0260313 A1 | 10/2009 | Segaert | |
| 2010/0055420 A1 | 3/2010 | Vermeulen | |
| 2010/0083603 A1 | 4/2010 | Goodwin | |
| 2011/0056167 A1 | 3/2011 | Nilsson | |
| 2011/0138722 A1 | 6/2011 | Hannig | |
| 2011/0268937 A1 | 11/2011 | Schacht et al. | |
| 2011/0300392 A1 | 12/2011 | Vermeulen | |
| 2011/0308182 A1 | 12/2011 | Downey | |
| 2012/0015107 A1 | 1/2012 | Schacht et al. | |
| 2012/0266555 A1 | 10/2012 | Cappelle | |
| 2013/0062006 A1 | 3/2013 | Meersseman et al. | |
| 2013/0067842 A1 | 3/2013 | Meersseman et al. | |
| 2013/0295352 A1 | 11/2013 | Thiers et al. | |

(56) References Cited

U.S. PATENT DOCUMENTS

| | | |
|---|---|---|
| 2014/0020820 A1 | 1/2014 | Meersseman et al. |
| 2014/0033635 A1 | 2/2014 | Pervan et al. |

FOREIGN PATENT DOCUMENTS

| | | |
|---|---|---|
| CN | 1119152 A | 3/1996 |
| CN | 2301491 Y | 12/1998 |
| CN | 2364121 Y | 2/2000 |
| CN | 101023230 A | 8/2007 |
| CN | 101072691 A | 11/2007 |
| CN | 100354492 C | 12/2007 |
| CN | 201268019 Y | 7/2009 |
| CN | 100523404 C | 8/2009 |
| CN | 101629446 A | 1/2010 |
| DE | 1 534 802 A1 | 4/1970 |
| DE | 27 21 292 A1 | 11/1978 |
| DE | 28 56 391 A1 | 7/1980 |
| DE | 254 920 A1 | 3/1988 |
| DE | 195 32 819 A1 | 3/1997 |
| DE | 197 25 829 C1 | 8/1998 |
| DE | 19944399 A1 | 4/2001 |
| DE | 203 00 306 U1 | 4/2003 |
| DE | 203 00 291 U1 | 11/2003 |
| DE | 10 2004 009 160 A1 | 9/2005 |
| DE | 10 2004 023 157 A1 | 11/2005 |
| DE | 20 2005 019 427 U1 | 4/2006 |
| DE | 10 2006 054 023 A1 | 12/2007 |
| DE | 20 2008 008 597 U1 | 8/2008 |
| DE | 20 2008 011 589 U1 | 11/2008 |
| DE | 202008011589 U1 | 11/2008 |
| EP | 0 007 230 A2 | 1/1980 |
| EP | 0 130 559 A2 | 1/1985 |
| EP | 0 562 402 A1 | 9/1993 |
| EP | 0 864 712 A2 | 9/1998 |
| EP | 1 026 341 A2 | 8/2000 |
| EP | 1 138 467 A1 | 10/2001 |
| EP | 1 154 090 A1 | 11/2001 |
| EP | 1 247 641 A1 | 10/2002 |
| EP | 1 262 607 A1 | 12/2002 |
| EP | 1 262 609 A1 | 12/2002 |
| EP | 1 290 290 A1 | 3/2003 |
| EP | 1 454 763 A2 | 9/2004 |
| EP | 1 469 140 A1 | 10/2004 |
| EP | 1 493 879 A1 | 1/2005 |
| EP | 1 593 796 A1 | 11/2005 |
| EP | 1 705 309 A2 | 9/2006 |
| EP | 1 872 959 A1 | 1/2008 |
| EP | 1 892 352 A2 | 2/2008 |
| EP | 1 938 963 A1 | 7/2008 |
| EP | 2 130 991 A2 | 12/2009 |
| FR | 2 149 112 A5 | 3/1973 |
| FR | 2 271 365 A1 | 12/1975 |
| FR | 2 609 664 A1 | 7/1988 |
| FR | 2 827 529 A1 | 1/2003 |
| GB | 900 958 A | 7/1962 |
| GB | 1 015 701 A | 1/1966 |
| GB | 1 467 899 A | 3/1977 |
| GB | 1 520 964 A | 8/1978 |
| GB | 2 020 998 A | 11/1979 |
| GB | 2 145 371 A | 3/1985 |
| GB | 2 376 916 A | 12/2002 |
| JP | S60-255843 A | 12/1985 |
| JP | S62-127225 A | 6/1987 |
| JP | H03-169967 A | 7/1991 |
| JP | H05-214803 A | 8/1993 |
| JP | H06-64108 A | 3/1994 |
| JP | H07-180333 A | 7/1995 |
| JP | 2000-170361 A | 6/2000 |
| KR | 1996-0005785 Y1 | 7/1996 |
| NL | 8000083 A | 8/1981 |
| WO | 95/11333 A1 | 4/1995 |
| WO | 96/27721 A1 | 9/1996 |
| WO | 97/18949 A1 | 5/1997 |
| WO | 97/47834 A1 | 12/1997 |
| WO | 99/17930 A1 | 4/1999 |
| WO | 99/45060 A1 | 9/1999 |
| WO | 00/47841 A1 | 8/2000 |
| WO | 01/09461 A1 | 2/2001 |
| WO | 01/47724 A1 | 7/2001 |
| WO | 01/47725 A1 | 7/2001 |
| WO | 01/48333 A1 | 7/2001 |
| WO | 01/83488 A1 | 11/2001 |
| WO | 01/96689 A1 | 12/2001 |
| WO | 0198604 A1 | 12/2001 |
| WO | 02/00449 A1 | 1/2002 |
| WO | 02/04206 A1 | 1/2002 |
| WO | 03/012224 A1 | 2/2003 |
| WO | 03/089736 A1 | 10/2003 |
| WO | 2004/015221 A1 | 2/2004 |
| WO | 2004/042168 A1 | 5/2004 |
| WO | 2005/018833 A1 | 3/2005 |
| WO | 2005/033204 A1 | 4/2005 |
| WO | 2006/033706 A1 | 3/2006 |
| WO | 2006/066776 A2 | 6/2006 |
| WO | 2006/090287 A1 | 8/2006 |
| WO | 2006/103565 A2 | 10/2006 |
| WO | 2007/059967 A1 | 5/2007 |
| WO | 2007/081267 A1 | 7/2007 |
| WO | 2007/113676 A2 | 10/2007 |
| WO | 2007/141605 A2 | 12/2007 |
| WO | 2008/078181 A1 | 7/2008 |
| WO | 2008/091045 A1 | 7/2008 |
| WO | 2009/061279 A1 | 5/2009 |
| WO | 2009/118709 A2 | 10/2009 |
| WO | 2010/023042 A1 | 3/2010 |
| WO | 2010/088769 A1 | 8/2010 |
| WO | 2011/028171 A1 | 3/2011 |
| WO | 2012/001091 A1 | 1/2012 |
| WO | 2012/001109 A1 | 1/2012 |
| WO | 2012/004700 A2 | 1/2012 |

OTHER PUBLICATIONS

WPI Database week 199338 Thomson Scientific, Lodon, GB; AN 1993-300138 XP002621436, 1 page, Feb. 16, 2011 08:59:55.
Search Report Issued in BE 2010/00420, dated Feb. 15, 2011, 15 pages.
Search Report Issued in BE 2010/00705, dated May 23, 2011, 10 pages.
Search Report Issued in BE 2010/00713, dated Jun. 14, 2011, 12 pages.
Search Report Issued in BE 2011/0719, dated Sep. 27, 2011, 9 pages.
Search Report Issued in BE 2011/0247, dated Sep. 28, 2011, 8 pages.
International Search Report and Written Opinion from International Application No. PCT/IB2011/051884, Nov. 22, 2011, 12 pages.
International Search Report and Written Opinion from International Application No. PCT/IB2011/051886, Feb. 21, 2012, 16 pages.
Search Report Issued in BE 2011/00128, Jun. 19, 2012, 15 pages.
International Search Report and Written Opinion from International Application No. PCT/IB2011/052715, Aug. 21, 2012, 16 pages.
International Search Report and Written Opinion issued in PCT/IB2010/055693, Jun. 24, 2011.
European Search Report issued in EP application No. 09015855.1, Jun. 7, 2010.

* cited by examiner

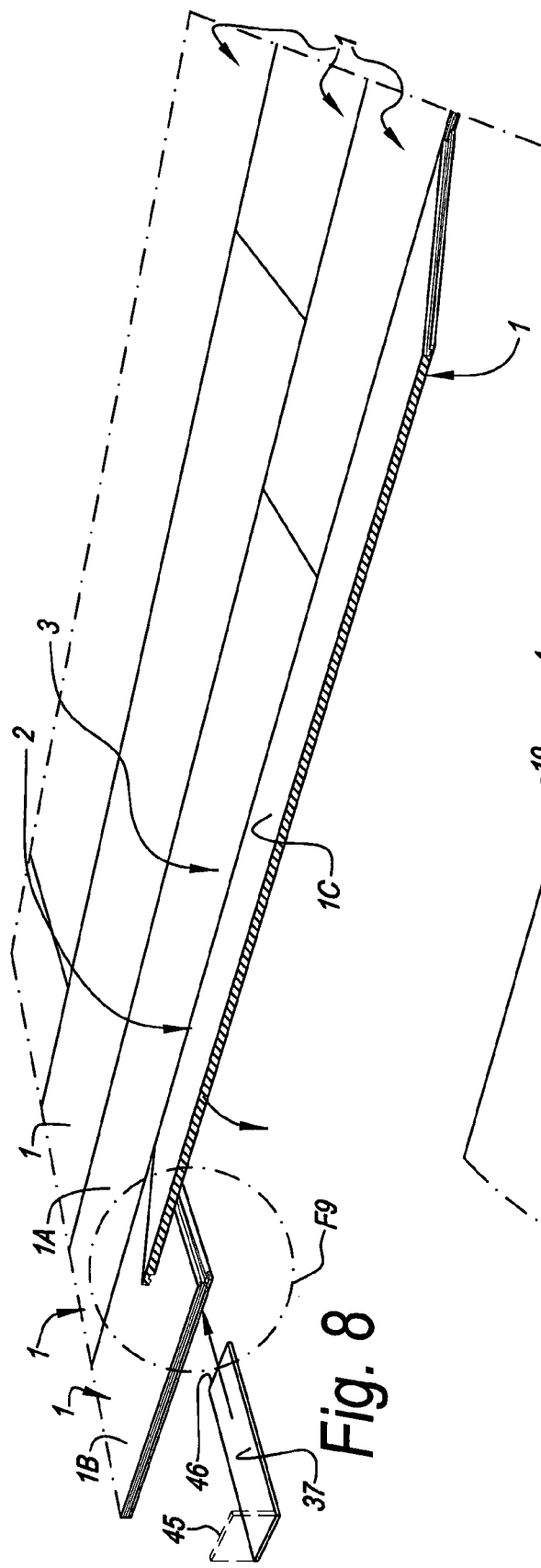
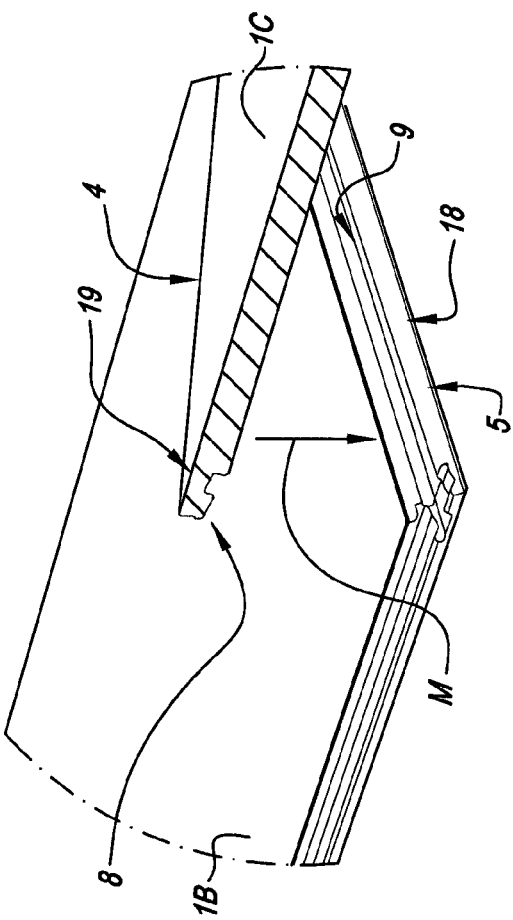

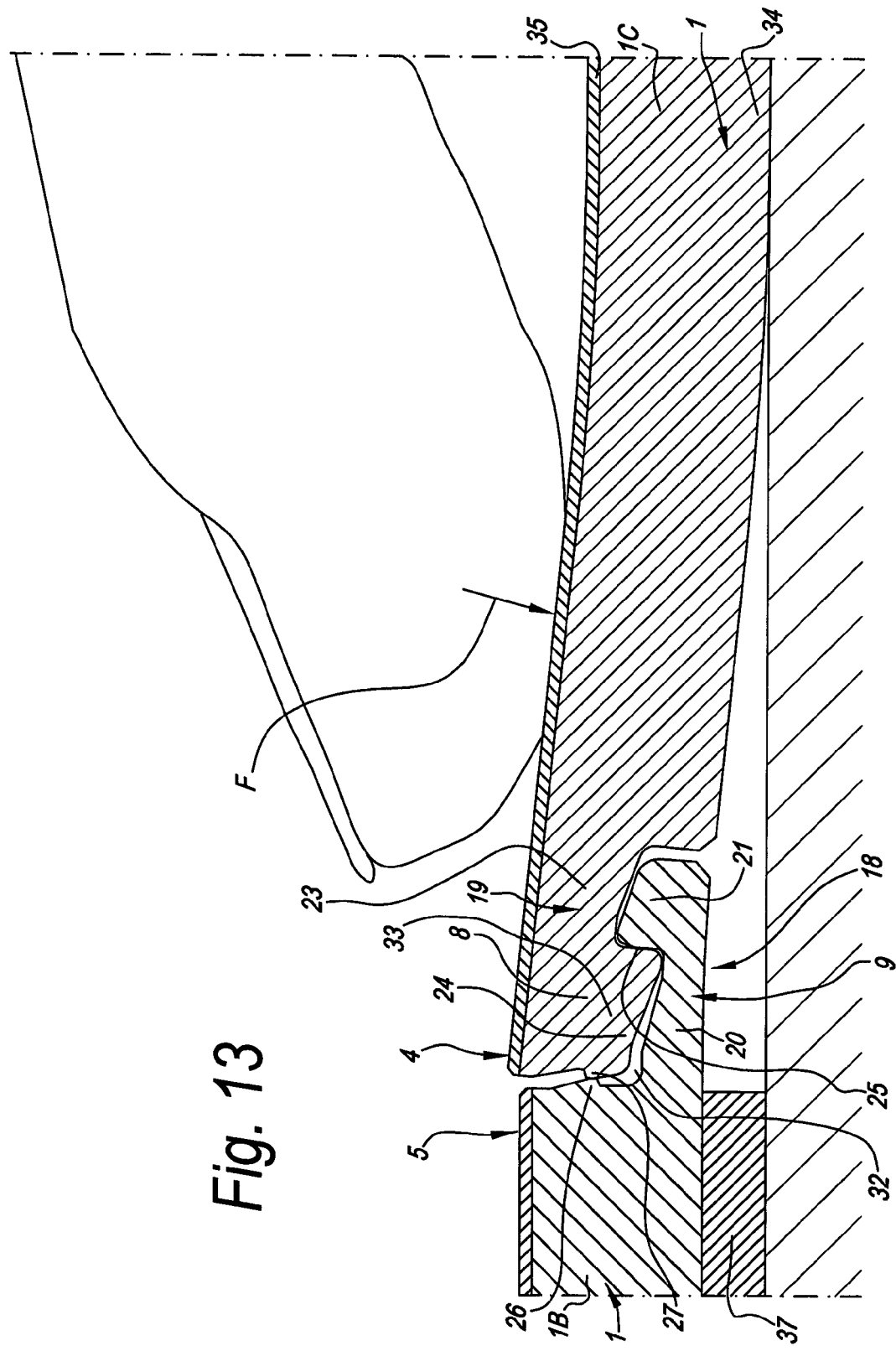

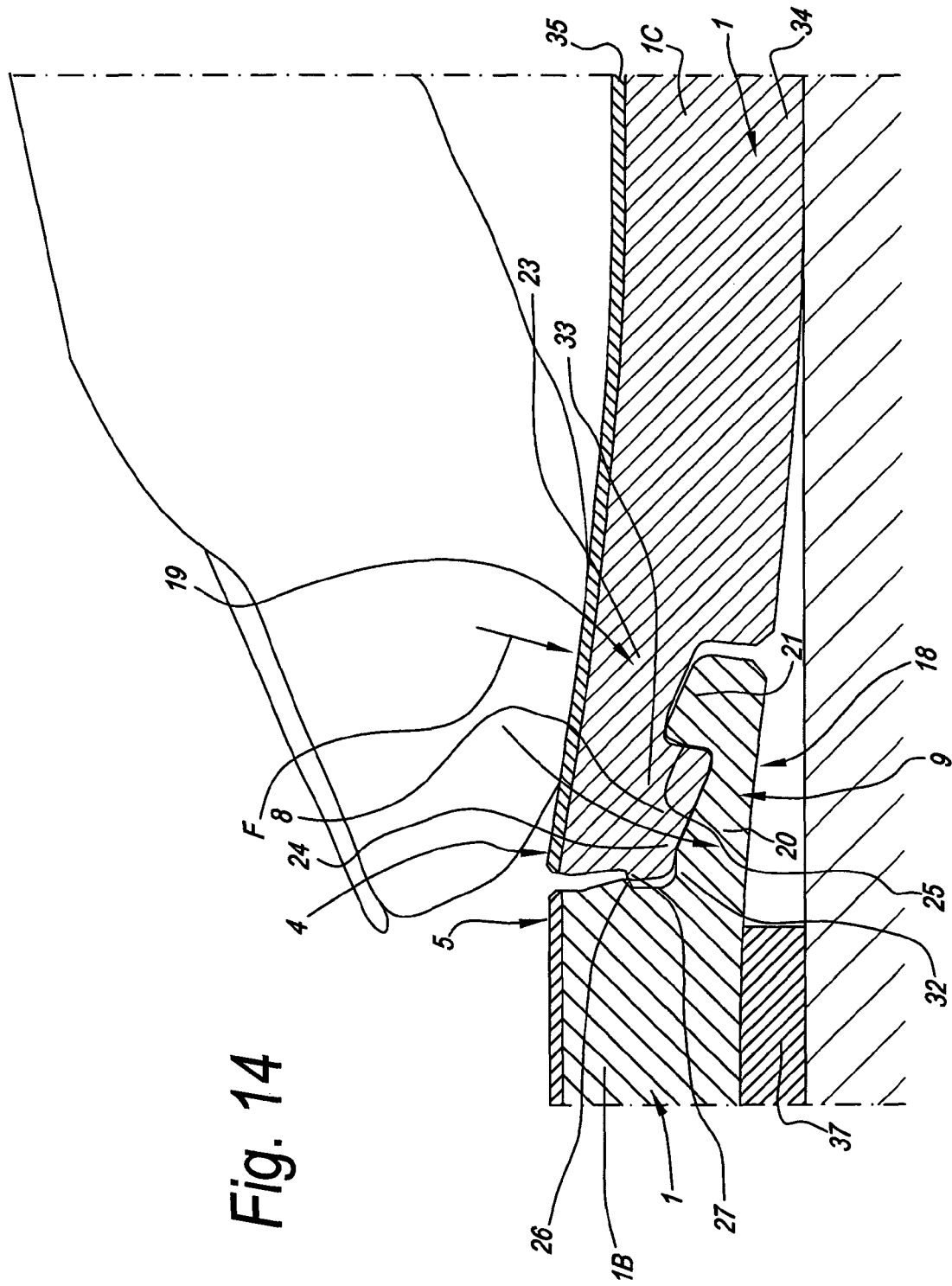

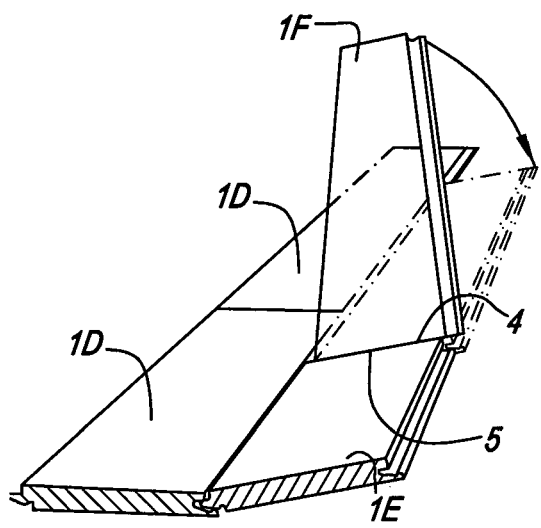
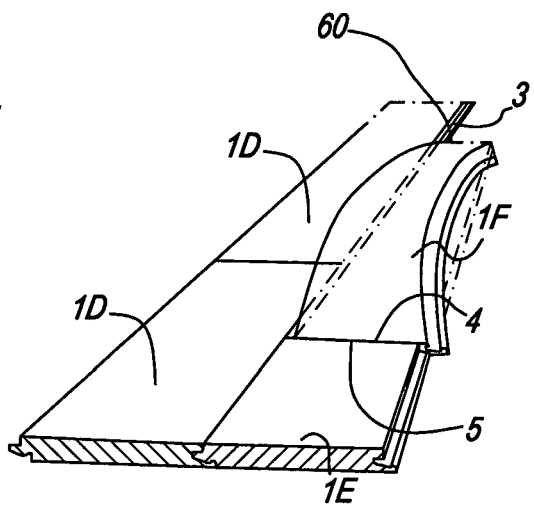
Fig. 26   Fig. 27
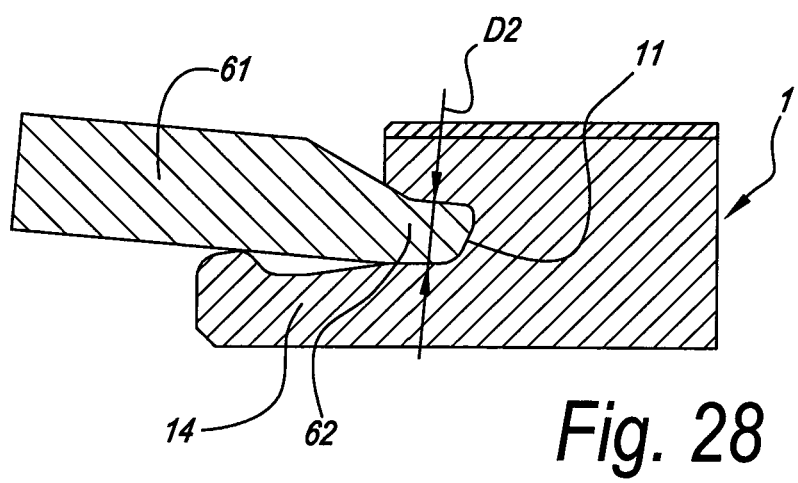
Fig. 28

PANEL, COVERING AND METHOD FOR INSTALLING SUCH PANELS

CROSS REFERENCE TO RELATED APPLICATIONS

This application is a continuation of U.S. application Ser. No. 13/518,112, filed Jun. 21, 2012, which is the national stage of PCT/IB2010/055693, filed Dec. 9, 2010, which claims priority to European Application No. 09015855.1, filed Dec. 22, 2009, which further claims the benefit of the filing date of U.S. provisional patent application Ser. No. 61/333,510, filed May 11, 2010, the entire contents of all of which are incorporated by reference in their entirety.

BACKGROUND OF THE INVENTION

1. Field of the Invention

This invention relates to a panel, a covering formed of such panels, and a method for installing such panels.

Primarily, the invention relates to floor panels, more particularly decorative floor panels for forming a floor covering, however, it is not excluded to apply the invention with other forms of coverings, for example, as wall panels, ceiling panels and the like.

The invention relates in particular to panels consisting of supple synthetic material, more particularly panels consisting of soft PVC (polyvinyl chloride), also called vinyl tiles or vinyl strips. Often, also the abbreviation LVT is used for such tiles, which stands for Luxurious Vinyl Tile. Herein, this then relates particularly to vinyl tiles with a full core, said core whether or not being composed of layers and substantially consisting of a material on the basis of PVC, amongst which recycled or un-recycled PVC.

2. Related Art

Panels of synthetic material are known, amongst others, from US 2002/0189183. Herein, reference is also made to the American patent application Ser. No. 09/152,684, which is granted under the U.S. Pat. No. 6,306,318, and wherein for the material, the use of PVC is stated. The panels represented in the document US 2002/0189183 are formed in a mold. This technique shows the disadvantage that it is expensive and that the production rate is low. Further, the panels obtained in this manner are subjected to tolerance deviations as a result of the fact that expansions may occur when removing the panels from the mold, as a consequence of which the coupling means possibly formed at the edges, when installing the panels, either are difficult to fit into each other, or are sitting too loosely in each other.

A first aim of the invention consists in offering solutions for coupling such panels of PVC, or of another supple synthetic material, to each other in an adequate manner, such by means of appropriate coupling parts.

Moreover, the invention in general also relates to a panel, in particular a floor panel, which, at least at two opposite edges, comprises coupling parts of the type allowing to couple two of such panels to each other by means of a downward movement of one panel in respect to the other, wherein these coupling parts form a first locking system, which effects a locking in the plane of the panels and perpendicularly to said edges, as well as form a second locking system, which effects a locking perpendicularly to the plane of the panels. A second aim of the invention consists in further optimizing panels of this type, such that the coupling parts offer new possibilities and, amongst others, also can be applied with panels of a supple material, more particularly said panels of soft PVC.

SUMMARY

Thus, according to a first aspect, the invention relates to a panel for forming a covering, more particularly a floor panel for forming a floor covering, which, at least at two opposite edges, comprises coupling parts of the type allowing to couple two of such panels to each other by means of a downward movement of one panel in respect to the other; wherein these coupling parts form a first locking system, which effects a locking in the plane of the panels and perpendicularly to said edges, as well as form a second locking system, which effects a locking perpendicularly to the plane of the panels; with the characteristic that at least one of said coupling parts is realized at least partially in soft PVC, as well as at least partially in the form of a milled profiled part of this soft PVC. By milling the coupling parts at least partially from soft PVC, very precise tolerances can be maintained. In combination with the use of PVC then very controllable elastic properties may be imparted to the coupling parts, whereby on the whole good properties are obtained, in respect to a smooth coupling as well as in respect to the strength of the coupling which can be realized by means of such coupling parts.

According to a deviating embodiment, the profiled parts, instead of by means of one or more milling treatments, can also be realized by one or more other mechanical cutting treatments.

In a preferred embodiment, the panel is realized as a supple PVC panel, thus, at least with a substrate on the basis of PVC, and said coupling parts are integrally made of this substrate, preferably entirely by means of a mechanical cutting treatment, more particularly by means of a milling process.

According to a second independent aspect, the invention relates to a panel for forming a covering, more particularly a floor panel for forming a floor covering, which, at least at two opposite edges, comprises coupling parts of the type allowing to couple two of such panels to each other by means of a downward movement of one panel in respect to the other; wherein these coupling parts form a first locking system, which effects a locking in the plane of the panels and perpendicularly to said edges, as well as form a second locking system, which effects a locking perpendicularly to the plane of the panels; wherein the first locking system is formed at least of an upwardly directed lower hook-shaped portion which is situated at one of said two edges, as well as of a downwardly directed upper hook-shaped portion which is situated at the opposite edge; and wherein the lower hook-shaped portion consists of a lip with an upwardly directed locking element, whereas the upper hook-shaped portion consists of a lip with a downwardly directed locking element; with the characteristic that at least one of said hook-shaped portions is bendable in respect to the plane of the respective panel, such that the pertaining locking element can perform a movement, more particularly a tilting movement, which facilitates coupling the panels.

Panels according to this second independent aspect offer the advantage that they can be coupled smoothly at said edges, as the tilting movement provides for that the locking elements can engage more smoothly one behind the other, possibly without necessarily having to overcome a snap effect.

It is noted that, as will be explained further, the intended bending as such can take place in such hook-shaped portion itself, as well as at a distance therefrom, wherein the hook-shaped portion in the latter case then as a whole adopts a bent-out position.

According to a preferred characteristic of the second aspect, the panel is characterized in that the coupling means are configured such that the downwardly directed locking element is configured such that the downwardly directed locking element must be brought through an opening between the upwardly directed locking element and a locking part of the second locking system and that the downwardly directed locking element and said opening are configured such that the downwardly directed locking element fits more smoothly through said opening when at least one of said hook-shaped portions is bent, compared to the case when none of both hook-shaped portions is bent.

According to a third independent aspect, the invention relates to a panel for forming a covering, more particularly a floor panel for forming a floor covering; wherein this panel comprises a substrate of a material on the basis of soft PVC; wherein this panel is rectangular, either oblong or square, and thus comprises a first pair of opposite edges and a second pair of opposite edges; wherein both pairs of opposite edges comprise coupling parts allowing to mutually couple a plurality of such panels to each other; wherein these coupling parts at both pairs of edges form a first locking system which effects a locking in the plane of the panels and perpendicular to the respective edges, as well as form a second locking system which effects a locking perpendicular to the plane of the panels; and wherein these coupling parts substantially are realized from said substrate; with the characteristic that the coupling parts at the first pair of opposite edges are configured such that two of such panels can be coupled to each other at these edges by means of a turning movement; and that the coupling parts at the second pair of opposite edges are configured such that two of such floor panels can be coupled to each other by means of a downward movement of one panel in respect to the other, more particularly by means of the downward movement obtained as a result of the turning movement at the first pair of edges.

According to a preferred embodiment, this floor panel further is characterized in that the second locking system at the second pair of edges consists of locking parts engaging behind each other, which can be brought one behind the other by their elasticity and/or movability.

Panels according to the third aspect of the invention offer the advantage that, by also integrating the coupling parts at the second pair of sides into the substrate, ideal properties are obtained for realizing a coupling which allows a locking by means of a downward movement.

According to a fourth independent aspect, the invention relates to a panel for forming a covering, more particularly a floor panel for forming a floor covering; which, at least at two opposite edges, comprises coupling parts of the type allowing to couple two of such panels to each other by means of a downward movement of one panel in respect to the other; wherein these coupling parts form a first locking system, which effects a locking in the plane of the panels and perpendicularly to said edges, as well as form a second locking system, which effects a locking perpendicularly to the plane of the panels; wherein the first locking system is formed at least of an upwardly directed lower hook-shaped portion which is situated at one of said two edges, as well as of a downwardly directed upper hook-shaped portion which is situated at the opposite edge; wherein the lower hook-shaped portion consists of a lip with an upwardly directed locking element, whereas the upper hook-shaped portion consists of a lip with a downwardly directed locking element; and wherein the second locking system comprises locking parts which are situated next to the proximal end of the lower hook-shaped portion and the distal end of the upper hook-shaped portion, respectively; characterized in that at least one of said locking parts of the second locking system is made from soft PVC.

Herein, said locking parts preferably are made as a fixed and preferably compressible part.

More particularly, it is preferred herein that the panel substantially consists of a substrate on the basis of soft PVC and that said coupling parts are integrally realized in said substrate, wherein said locking parts are realized as fixed, possibly somewhat compressible parts.

By making use of soft PVC in a coupling system with coupling parts which can be joined together by a downward movement, it is obtained that the coupling parts can move smoothly along each other during coupling.

According to a fifth independent aspect, the invention relates to a panel for forming a covering, more particularly a floor panel for forming a floor covering; wherein this panel is of the type which comprises a substrate of supple synthetic material; wherein this panel, at least at two opposite edges, comprises coupling parts of the type allowing to couple two of such panels to each other by means of a downward movement of one panel in respect to the other; wherein these coupling parts form a first locking system, which effects a locking in the plane of the panels and perpendicularly to said edges, as well as form a second locking system, which effects a locking perpendicularly to the plane of the panels; wherein the first locking system is formed at least of an upwardly directed lower hook-shaped portion which is situated at one of said two edges, as well as of a downwardly directed upper hook-shaped portion which is situated at the opposite edge; characterized in that in said substrate, a reinforcement layer is present, which extends in the plane of the panel; that the lower hook-shaped portion consists of a lip with an upwardly directed locking element, whereas the upper hook-shaped portion consists of a lip with a downwardly directed locking element; and that at least one of said lips is configured such that, seen in cross-section, it is at least over a certain portion free from said reinforcement layer. Preferably, both lips are configured in this manner.

The term "reinforcement layer" is to be understood in a broad sense and also simply includes a layer which, for example, is applied as a basic carrier for building up the vinyl structure.

As one or both of the lips, over at least a portion thereof, are kept free from such reinforcement layer, the advantage is obtained that such reinforcement layer cannot affect the bendability in these portions in a disadvantageous manner.

It is noted that the invention also relates to all possible combinations of the aforementioned aspects, wherein two, three, four or all five of said aspects are combined with each other. Herein, all mathematically possible combinations of the five aspects can be taken into consideration.

According to preferred embodiments, the panels of the aforementioned one or more aspects also show one or more of the hereafter listed additional characteristics, inasmuch as these characteristics do not already form part of the basic characteristics of such aspect. These characteristics consist in:

that at least said coupling parts, which are of the type allowing that two of such floor panels can be coupled to each other by means of a downward movement of one panel in respect to the other, are realized at least partially and preferably entirely of soft PVC;

that it comprises a substrate of soft PVC and that at least said coupling parts, which are of the type allowing that two of such floor panels can be coupled to each other by means of a downward movement of one panel in respect to the other, are integrally realized from the substrate;

that said coupling parts, which are of the type allowing that two of such floor panels can be coupled to each other by means of a downward movement of one panel in respect to the other, have a first locking system, which is formed at least of a downwardly directed first lower hook-shaped portion situated at one of the respective edges, as well as a downwardly directed upper hook-shaped portion situated at the opposite edge;

that this panel is rectangular, either oblong or square, and thus comprises a first pair of opposite edges and a second pair of opposite edges, wherein both pairs of opposite edges comprise coupling parts allowing to mutually couple a plurality of such panels to each other, wherein these coupling parts at both pairs of edges form a first locking system which effects a locking in the plane of the panels and perpendicular to the respective edges, as well as form a second locking system which effects a locking perpendicularly to the plane of the panels, and wherein the coupling parts at one of both pairs of edges thus are formed by said coupling parts which are of the type allowing that two of such floor panels can be coupled to each other by means of a downward movement of one panel in respect to the other;

that the panel substantially consists of a substrate and that the coupling parts at both pairs of edges are realized substantially integrally from this substrate;

that the substrate substantially consists of soft PVC, in which possibly a reinforcement layer is incorporated;

that the substrate substantially consists of soft PVC, with the exception of possible top layers, backing layers and intermediate layers, which may consist of another material.

According to a particular aspect of the invention, the coupling parts and/or the substrate and/or the entire panel consist of a supple synthetic material other than PVC, preferably having an elasticity comparable to that of soft PVC. It is clear that similar advantages are obtained. Also, compositions of materials are possible, for example, soft PVC with other materials, such as fillers. The PVC may consist of newly-made material as well as recycled PVC. It is clear that this also applies to the embodiments which are to follow.

The panels of the invention preferably are made in the form of rectangular oblong strips. The dimensions may vary greatly.

In respect to thickness of the embodiments aimed at herein above as well as herein below, this preferably varies between 3 and 10 mm, and still better between 4 and 7 mm.

At the decor side, they comprise a decorative layer, which may carry any image. In a practical embodiment, the image represents a wood motif. More particularly, on each panel the appearance of a wooden plank is represented.

Other additional characteristics will become clear from the detailed description and the claims. It is noted that all subsidiary characteristics can be combined at will with the main characteristics of the respective basic aspects.

According to a sixth independent aspect, the invention provides a method for installing panels, more particularly floor panels, wherein these panels are rectangular, either oblong or square, and thus comprise a first pair of opposite edges and a second pair of opposite edges; wherein both pairs of opposite edges comprise coupling parts, which form a first locking system which effects a locking in the plane of the panels and perpendicular to the respective edges, as well as form a second locking system which effects a locking perpendicular to the plane of the panels; wherein the coupling parts at the first pairs of opposite edges are configured such that two of such floor panels can be coupled to each other at these edges by means of a turning movement; wherein the coupling parts at the second pair of opposite edges are configured such that two of such floor panels can be coupled to each other by means of a downward movement of one panel in respect to the other, more particularly by means of the downward movement which is obtained as a result of the turning movement at the first pair of edges; wherein at the second pair of edges, the locking system is formed at least of an upwardly directed lower hook-shaped portion situated at one of said two edges, as well as of a downwardly directed upper hook-shaped portion which is situated at the opposite edge; and wherein the lower hook-shaped portion consists of a lip with an upwardly directed locking element, whereas the upper hook-shaped portion consists of a lip with a downwardly directed locking element; with the characteristic that at the second pair of edges coupling parts are applied of which at least one of the lips, in respect to the plane of the panel concerned, can be bent out of this plane, such that the pertaining locking element can perform a movement, more particularly a tilting movement, which facilitates the coupling of the panels, and that the method provides at least the following steps:

installing a first panel intended for forming part of a first row of panels;

coupling a second panel to said first panel, such at said first pair of edges, wherein this second panel is intended for forming part of a second row successive to said first row of panels;

coupling in the second row a third panel both to said second panel and to the first panel, wherein the third panel is coupled to the first panel by means of a turning movement, wherein the third panel, from an upwardly pivoted position, is brought into substantially the same plane as the first and second panels, whereas, as a result of this movement and the downward pressing-together movement created therein, the hook-shaped portions engage into each other between the third and second panel; applying an underlay element therein;

and, during pressing together, as a result of the use of the underlay element, deforming, more particularly bending, at least one of said lips in such a manner that coupling, as aforementioned, is facilitated.

According to a variant, not specifically one or more lips are bent, but one or more of the hook-shaped portions are bent as a whole or locally, wherein the bending thus does not necessarily have to take place in the lips themselves.

This installation technique allows a smooth installation, without necessitating tools. Further advantages, as well as preferred techniques, will become clear from the detailed description.

It is clear that the method of the sixth aspect shows its advantages in particular when it is applied for installing panels in the form of strips or tiles on the basis of soft PVC, which are provided with said coupling parts.

According to a deviating variant of the sixth aspect, the invention also relates to a method wherein the above-described, as well as below-described, technique in which an underlay element is applied and a bending is created, is applied for panels wherein at the first pair of edges the connection is performed in another manner than by means of a turning movement. The essence in fact consists in the particular technique of bending the coupling parts at one pair of edges, irrespective of the manner in which the other pair of edges is coupled.

In a preferred embodiment, in the aforementioned method panels are applied which also fulfill one or more of the aforementioned first five aspects.

It is noted that "soft PVC" is a term which expresses that this relates to supple PVC, in other words, PVC which is bendable in a relatively smooth manner. The term soft PVC is generally known in the art. Such soft PVC consists of PVC which is softened, preferably by means of a plasticizer added during the production process. Depending on the amount of plasticizer added, of course different degrees of suppleness can be obtained.

By a plasticizer, any agent is to be understood, which, when added, results in a more supple PVC. Typical examples are phthalate plasticizers and isosorbide plasticizers.

By PCV which has been plasticized, of course, also PVC can be understood, or a composition on the basis of PVC, which as such has the feature that it is supple, for example, because it is modified.

Preferably, a suppleness will be applied which is such that, when a panel is gripped horizontally at one extremity, it indeed will bend downward under its own weight and possibly at a distance from the clamped portion indeed will hang downward completely, however, certainly will not limply hang downward directly after the clamped end, however, it will still be well bendable by a manual force.

Also, it is noted that a number of the independent basic aspects are not restricted to the use of PVC or another synthetic material. Thus, it is clear that these aspects may also be applied in panels of other materials.

Although the herein above-described coupling systems are particularly useful when applied in panels having a substrate on the basis of synthetic material, and in particular PVC panels, with soft PVC it was found that in particular under the influence of heat, for example, sun radiation on a floor, a considerable expansion can take place, with the result that with such soft PVC, there is a risk that the panels, at their edges, are pushed upward against each other, which can result in that couplings, which are of the type allowing a connection by means of a downward movement, simply are pushed out of each other. According to a seventh aspect, a solution for this is offered.

According to this seventh aspect, the invention relates to a panel for forming a covering, more particularly a floor panel for forming a floor covering; wherein this panel comprises a substrate of a material on the basis of soft PVC; wherein this panel is rectangular, either oblong or square, and thus comprises a first pair of opposite edges and a second pair of opposite edges, wherein both pairs of opposite edges comprise coupling parts allowing to couple a plurality of such panels to each other; wherein these coupling parts, at both pairs of edges, form a first locking system effecting a locking in the plane of the panels and perpendicular to the respective edges, as well as form a second locking system effecting a locking transverse to the plane of the panels; and wherein these coupling parts substantially are realized from said substrate; characterized in
  that the coupling parts of the first pair of opposite edges, as well as of the second pair of opposite edges are configured such that two of such panels can be coupled to each other at these edges by means of a turning movement;
  that to this aim, these coupling parts, at each of the aforementioned two pairs of edges, consist of a tongue and a groove, as well as locking parts, which, in the coupled condition, prevent the drifting apart of the tongue and groove;
  and that at both pairs the groove each time is bordered by a lower lip and an upper lip, whereby the lower lip extends laterally up to beyond the distal end of the upper lip.

By the tongue and groove intended in the seventh aspect, a tongue and groove system is meant wherein the tongue and groove are so pronounced that they cannot be forced into each other by means of a manual downward movement and thus can be interconnected only in another manner, for example, by a turning movement and/or a shifting movement.

As, at both pairs of edges, coupling parts are provided, which can be brought into each other by means of a turning movement and which comprise a pronounced tongue and groove system, the panels can no longer be pushed out of each other in upward direction at their edges, by which permanent coupling remains guaranteed.

It is noted that up to now, the application of so-called angle connections at both pairs of edges of panels of soft PVC had been thought impossible, as such panels, during coupling, then have to be subjected at least to a number of manual shifting operations in longitudinal direction along coupled edges, and as it was assumed that parts consisting of soft PVC, in this case, thus, tongue and groove, would not allow such manual shifting operations due to the large friction therebetween. Against all such assumptions, however, the inventor has found that it still is possible indeed. Thus, by means of the seventh aspect, this prejudice is overcome.

According to a preferred embodiment of the seventh aspect of the invention, the panel is characterized in that the aforementioned locking parts at both pairs are provided with locking surfaces, which are situated at least partially in the portion of the lower lip which is situated beyond the distal end of the upper lip. Thereby, the locking part of the tongue can be brought smoothly behind the locking part of the groove when being inserted by turning.

According to still another preferred embodiment of the seventh aspect of the invention, the panel is characterized in that at least at one pair of edges, the tongue and groove have a shape providing for that, in the coupled condition of two of such panels, a space is present underneath the tongue, said space extending continuously underneath the tongue as from the tip of the tongue, at least up to a location which is situated beyond the distal end of the upper lip. The use of such space has the advantage that panels, during installation, can be moved smoothly along each other, as the risk of getting stuck and of friction during installation is reduced. Also, due to this space, the insertion of the tongue in the groove is avoided.

Preferably, said space extends underneath the tongue over a length, measured parallel to the surface of the panel, which is at least 1.5 and still better at least 2 times the distance from the tip of the tongue up to the distal end of the upper lip. Hereby, the risk of the occurrence of undesired clamping effects among the panels during their installation is minimized even further.

According to the seventh aspect, it is further preferred that the panel is oblong and thus has a long and a short side, and that at least the edges of the short sides provide for such space. This is particularly useful when the panels are installed by means of a so-called "angle-angle-technique", as clamping effects will occur easily herein, which, particularly in the case of panels consisting of soft PVC, might lead to situations which might render the installation considerably difficult.

According to a particular embodiment, the panel is characterized in that it is manually bendable in at least one direction in such a manner that it can be inserted, at the edges extending transverse to this direction, with a tongue over the lower lip of a preceding panel in the groove of this preceding panel, until the upper edges touch each other, and without bending the lower lip of the preceding panel, whereas the panel concerned, at the edge located opposite to the edge having said tongue, is bent down until it touches the underlying surface. The advantage thereof will become evident from the following description.

According to still another embodiment of the seventh aspect, the panel is characterized in that it is manually bendable in at least one direction in such a manner that it can be inserted, at the edges extending transverse to this direction, with a tongue over the lower lip of a preceding panel in the groove of this preceding panel, until the upper edges touch each other, and without bending the lower lip of the preceding panel, whereas the panel concerned, at the edge located opposite to the edge having said tongue, is bent down until it touches the underlying surface, and that the pair of edges extending transverse to said direction relates to the same pair of edges as the pair of edges which provides for the aforementioned space. This combination of characteristics is particularly useful for coupling the panels to each other by means of the "angle-angle-technique".

In a practical embodiment of the seventh aspect, both pairs of edges provide for such space in the coupled condition.

According to another embodiment, the panel of the seventh aspect is characterized in that the tongue and groove of at least one pair of edges are realized such that, when two of such panels are presented to each other at these edges in a plane-parallel manner, the tongue, at least with its tip, comes to sit at least partially underneath the lip bordering the upper side of the groove, without any bending being necessary already. The other pair of edges then in coupled condition preferably provides a space, as described herein above.

Even only the application of said space with panels consisting of a material on the basis of soft PVC already results in a coupling system which is advantageous in respect to the existing systems. In fact, it is clear that thereby less clamping effects will occur when coupling two such panels, and installation will become considerably easier. Therefor, the invention, according to an eighth independent aspect, relates to a panel for forming a covering, more particularly a floor panel for forming a floor covering; wherein this panel comprises a substrate of a material on the basis of soft PVC; wherein this panel is rectangular, either oblong or square, and thus comprises a first pair of opposite edges and a second pair of opposite edges; wherein both pairs of opposite edges comprise coupling parts allowing to couple a plurality of such panels to each other; wherein these coupling parts, at both pairs of edges, form a first locking system effecting a locking in the plane of the panels and perpendicular to the respective edges, as well as form a second locking system effecting a locking transverse to the plane of the panels; and wherein these coupling parts substantially are realized from said substrate; characterized in that to this aim, these coupling parts, at least at one of the aforementioned two pairs of edges, consist of a tongue and a groove, as well as locking parts, which, in the coupled condition, prevent the drifting apart of the tongue and groove;

that said groove each time is bordered by a lower lip and an upper lip, whereby the lower lip extends laterally up to beyond the distal end of the upper lip; and that said tongue and groove have a shape which provides for that, in the coupled condition of two of such panels, a space is present underneath the tongue, said space extending from the tip of the tongue continuously underneath the tongue at least up to a location situated beyond the distal end of the upper lip.

Preferably, the panel, according to the eighth aspect, further is characterized in that the tongue and groove, including the locking parts, are of the type allowing that two such panels can be interconnected at the respective edges by means of a turning movement. According to still another preferred characteristic, said tongue and groove are realized such that, when two of such panels are presented to each other at these edges in a plan-parallel manner, the tongue, at least with its tip, comes to sit at least partially underneath the lip bordering the upper side of the groove, without any bending being necessary already.

In the case of oblong panels, the aforementioned space preferably is provided at the short sides.

It is clear that the use of such space can also be useful with panels consisting of other synthetic materials. Consequently, the invention, according to the ninth independent aspect, relates to a panel for forming a covering, more particularly a floor panel for forming a floor covering; wherein this panel comprises a substrate of a material on the basis of soft PVC; wherein this panel is rectangular, either oblong or square, and thus comprises a first pair of opposite edges and a second pair of opposite edges; wherein both pairs of opposite edges comprise coupling parts allowing to couple a plurality of such panels to each other; wherein these coupling parts, at both pairs of edges, form a first locking system effecting a locking in the plane of the panels and perpendicular to the respective edges, as well as form a second locking system effecting a locking transverse to the plane of the panels; and wherein these coupling parts substantially are realized from said substrate; characterized in that the coupling parts of the first pair of opposite edges as well as of the second pair of opposite edges are configured such that two of such panels can be coupled to each other at these edges by means of a turning movement;

that these coupling parts, at least at one pair of edges, consist of a tongue and a groove, as well as locking parts, which, in the coupled condition, prevent the drifting apart of the tongue and groove;

that said groove is bordered by a lower lip and an upper lip, whereby the lower lip extends laterally up to beyond the distal end of the upper lip; and that said tongue and groove have a shape which provides for that, in the coupled condition of two of such panels, a space is present underneath the tongue, said space extending from the tip of the tongue continuously underneath the tongue at least up to a location situated beyond the distal end of the upper lip.

Here, too, it is preferred that, when the panel is oblong, said pair of edges providing for the aforementioned space is situated at the short sides of the panel.

According to the tenth independent aspect, the invention relates to a panel for forming a covering, more particularly a floor panel for forming a floor covering; wherein this panel comprises a substrate of a material on the basis of soft PVC; wherein this panel is rectangular, either oblong or square, and thus comprises a first pair of opposite edges and a second pair of opposite edges; wherein both pairs of opposite edges comprise coupling parts allowing to couple a plurality of such panels to each other; wherein these coupling parts, at both pairs of edges, form a first locking system effecting a locking in the plane of the panels and perpendicular to the respective edges, as well as form a second locking system effecting a locking transverse to the plane of the panels; and wherein these coupling parts substantially are realized from said substrate; characterized in that the coupling parts of at least the first pair of opposite edges are configured such that two of such panels can be coupled to each other at these edges by means of a turning movement;

that these coupling parts at the first pair of edges consist of a tongue and a groove, as well as locking parts, which, in the coupled condition, prevent the drifting apart of the tongue and groove;

that said groove is bordered by a lower lip and an upper lip, whereby the lower lip extends laterally up to beyond the distal end of the upper lip; and that said tongue and groove have a shape which provides for that, in the coupled condition of two of such panels, a space is present underneath the tongue, said space extending from the tip of the tongue continuously underneath the tongue at least up to a location situated beyond the distal end of the upper lip; and that the tongue is in connection with the remainder of the panel via a narrowed portion;

that the smallest thickness of the portion of the lower lip situated beyond the distal end of the upper lip, is smaller than the smallest thickness of said narrowed portion; and that the tongue in downward direction is supported on the groove by the locking surfaces and/or by a support point located proximally in respect to the locking surfaces.

According to an eleventh independent aspect, the invention relates to a panel for forming a covering, more particularly a floor panel for forming a floor covering; wherein this panel is rectangular, either oblong or square, and thus comprises a long side and a short side; wherein this panel, at least at the short side, is provided with coupling parts allowing to couple two of such panels to each other; wherein these coupling parts form a first locking system effecting a locking in the plane of the panels and perpendicular to the respective edges, as well as form a second locking system effecting a locking transverse to the plane of the panels; wherein said coupling parts comprise a tongue and a groove, as well as locking parts, which, in the coupled condition, prevent the drifting apart of the tongue and groove; and wherein the aforementioned groove is bordered by a lower lip and an upper lip, whereby the lower lip extends laterally up to beyond the distal end of the upper lip; characterized in that the panel according to a direction perpendicularly to the short sides is manually bendable in such a manner that it can be inserted, at the edges extending transverse to this direction, with a tongue over the lower lip of a preceding panel in the groove of this preceding panel, until the upper edges touch each other, and without bending the lower lip of the preceding panel, whereas the panel concerned, at the edge located opposite to the edge having said tongue, is bent down until it touches the underlying surface. Such panel offers the advantage that it can be brought smoothly with the tongue in the groove of the preceding panel at one end, whereas, on the other hand, the bent-down end allows a better alignment and positioning. It is clear that this eleventh aspect thus also is particularly useful with panels having a substrate on the basis of soft PVC.

According to a twelfth independent aspect, the invention relates to a panel for forming a covering, more particularly a floor panel for forming a floor covering; wherein this panel comprises a substrate of a material on the basis of soft PVC; wherein this panel is rectangular, either oblong or square, and thus comprises a first pair of opposite edges and a second pair of opposite edges; characterized in that at least one pair of opposite edges comprises coupling parts allowing to couple two of such panels to each other; wherein these coupling parts form a first locking system effecting a locking in the plane of the panels and perpendicularly to the edges concerned, as well as form a second locking system effecting a locking transverse to the plane of the panels; that these coupling parts substantially are realized from said substrate; that these coupling parts consist of a tongue and a groove, as well as locking parts, which, in the coupled condition, prevent the drifting apart of the tongue and groove; that the groove is bordered by a lower lip and an upper lip, wherein the lower lip extends laterally up to beyond the distal end of the upper lip; and that the coupling parts are configured such that two of such panels can be coupled to each other at these edges by means of a turning movement, as well as can be coupled to each other by means of a shifting and snap movement. Herein, the advantage is obtained that the installing person can realize a connection by turning as well as by snapping together, at choice.

According to a thirteenth independent aspect, the invention relates to a method for installing panels, wherein it relates to panels according to any of the aforementioned seventh to twelfth aspects, and wherein these panels substantially are formed of a synthetic material substrate, more particularly of soft PVC, characterized in that the panels are interconnected by means of an angle-angle-technique, wherein a newly to install panel is coupled to a preceding panel in a same row by means of a turning movement, such panel, in coupled condition, is subjected to a shifting movement in order to bring it against a panel in a preceding row, and this panel then is coupled to panels in a preceding row by turning it down together with the preceding panel from the same row; and that in said shifting movement, the contact between the coupling parts applied therein, which comprise and a groove, as well as locking parts, is kept small by applying a space underneath the tongue, said space extending continuously underneath the tongue as from the tip of the tongue, at least up to a location situated beyond the distal end of the upper lip. As explained further, the panels, thanks to the application of said space, can be installed in a smooth manner, although soft PVC shows the feature that two parts thereof are difficult to shift along each other.

BRIEF DESCRIPTION OF THE DRAWINGS

With the intention of better showing the characteristics of the invention, hereafter, as an example without any limitative character, some preferred embodiments are described, with reference to the accompanying drawings, wherein:

FIG. 8 represents how a plurality of panels from FIG. 1 can be connected to each other;

FIG. 9, at a larger scale, represents the portion indicated by F9 in FIG. 8;

FIGS. 12 and 13 further illustrate the aforementioned technique;

FIG. 14 represents another particular embodiment of said technique;

FIGS. 22 to 27 relate to methods for installing panels such as those from FIG. 16;

FIG. 28 schematically represents a step from the milling process for realizing a panel according to FIG. 16.

DETAILED DESCRIPTION OF VARIOUS EMBODIMENTS

In FIGS. 1 to 7, an embodiment of a panel 1 according to the invention is represented, which is realized as a floor panel, in which all first five aspects of the invention are applied.

In the represented example, the panel 1 is made as an oblong rectangular strip and thus comprises a first pair of opposite edges 2-3, which in this case form the long sides of the panel 1, and a second pair of opposite edges 4-5, which form the short sides of the panel 1.

Figure 1:
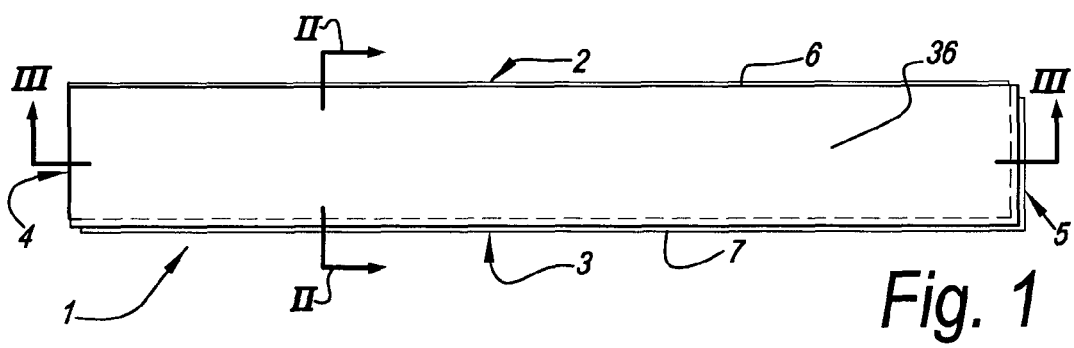
FIG. 1 in top plan view represents a panel, more particularly a floor panel, according to the invention.
Figure 2:
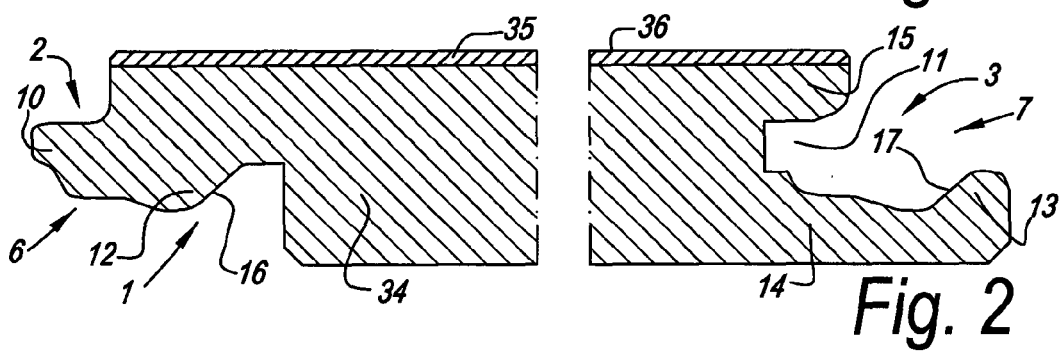
FIGS. 2 and 3, at a larger scale, represent cross-sections according to the lines II-II and III-III in FIG. 1.
Figure 3:
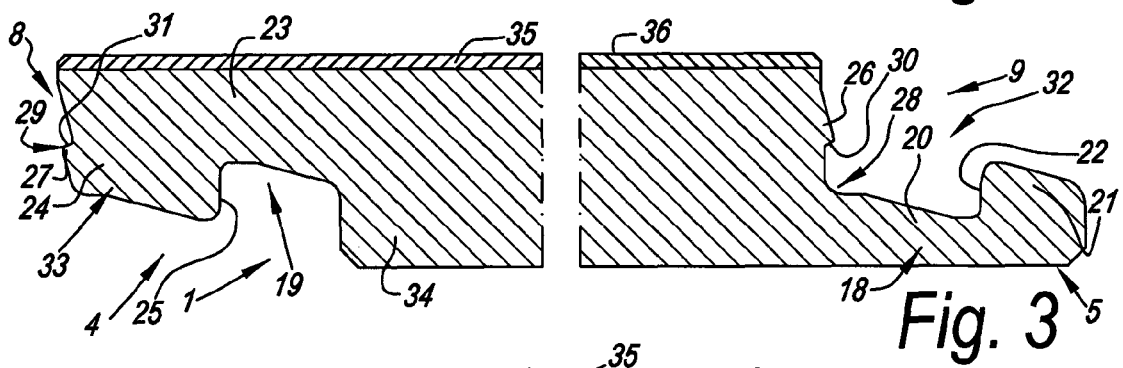

As is represented more in detail in FIGS. 2 and 3, both pairs of opposite edges 2-3 and 4-5 comprise coupling parts 6-7, 8-9, respectively, which allow to mutually couple a plurality of such panels 1 to each other.

Figure 4:
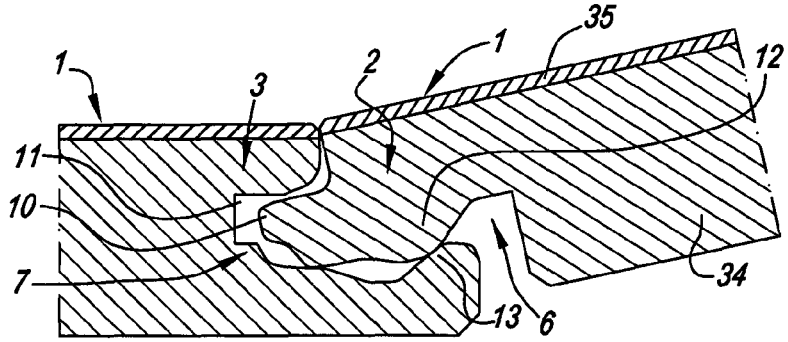
FIGS. 4 and 5 represent how the panels can be interconnected at their long sides.
Figure 5:
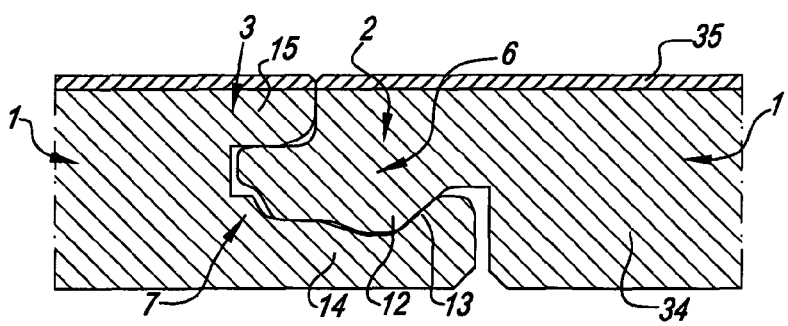

As specifically represented in the FIGS. 4 and 5, coupling parts 6-7 at the first pair of opposite edges 2-3 are configured such that two of such panels can be coupled to each other at these edges 2-3 in a locking manner by means of a turning movement. Herein, the coupling parts 6-7 form a first locking system which effects a locking in the plane of the panels 1 and perpendicularly to said edges 2-3, thus, in this case in the horizontal direction, as well as form a second locking system, which effects a locking perpendicularly to the plane of the panels 1, in this case, thus, in the vertical direction. To this aim, the coupling parts 6-7 are constructed as a tongue 10 and a groove 11, which provide for the vertical locking and comprise locking parts 12-13, which, in the coupled condition, prevent the shifting apart of the tongue and groove.

Herein, it is preferred that, as indicated, the groove 11 is limited by a lower lip 14 and an upper lip 15, and that the locking parts 12 and 13 are performed in the form of cooperating projections, at the lower side of the tongue 10 and at the upper side of the lower lip 14, respectively. The cooperation is performed by means of locking surfaces 16 and 17 provided for this purpose. As also represented, it is also preferred that the lower lip 14 extends laterally up to beyond the distal end of the upper lip 15, more particularly such that the locking surface 17 is situated entirely in that portion of the lower lip 14 which is situated beyond the upper lip 15.

Figure 6:
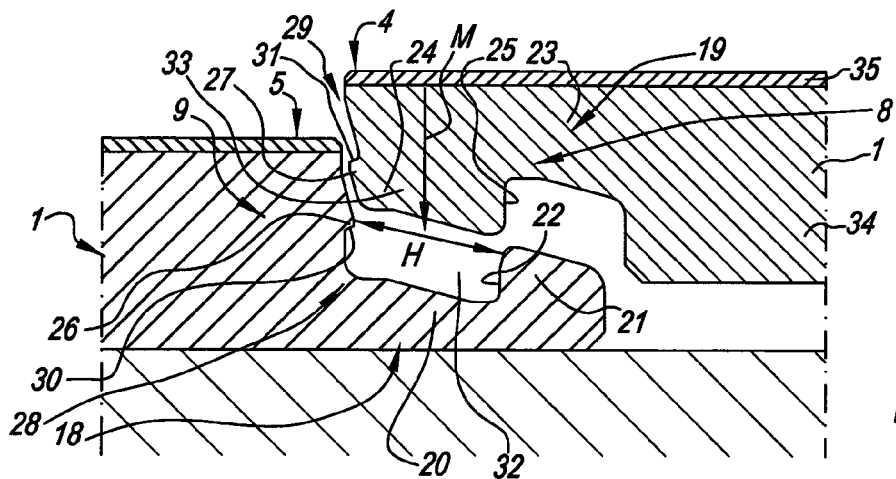
FIGS. 6 and 7 represent how the panels fit into each other at their short sides.
Figure 7:
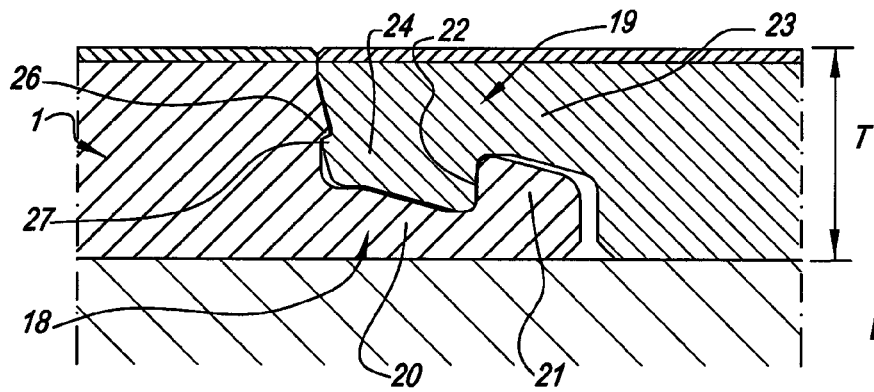
Figure 10:
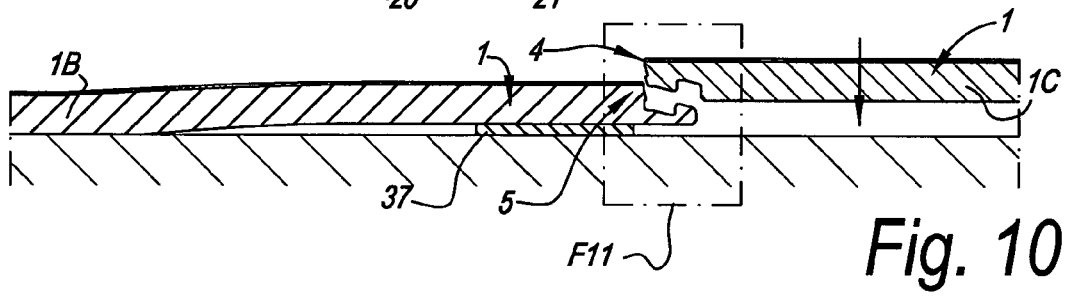
FIG. 10 represents a particular technique for interconnecting panels.

As schematically represented in FIGS. 6 and 7, the coupling parts 8-9 at the second pair of opposite edges 4-5 are configured such that two of such panels 1 can be coupled to each other by means of a downward movement of one panel in respect to the other. This downward movement will be discussed more detailed below.

As is clearly visible in FIG. 7, the coupling parts 8-9 herein also form a first locking system, which effects a locking in the plane of the panels 1 and perpendicular to said edges 4-5, thus, in the case in the horizontal direction, as well as a second locking system, which effects a locking perpendicularly to the plane of the panels 1, in this case, thus, the vertical direction.

The first locking system is substantially formed of an upwardly directed lower hook-shaped portion 18 situated at the edge 5, as well as of a downwardly directed upper hook-shaped portion 19 which is situated at the opposite edge 4, which hook-shaped portions can be engaged one behind the other by said downward movement. The lower hook-shaped portion 18 consists of a lip 20, which extends laterally from the lower edge of the panel 1 and which is provided with an upwardly directed locking element 21 with a locking surface 22, whereas the upper hook-shaped portion 19 consists of a lip 23, which extends laterally from the upper edge of the panel 1 and which is provided with a downwardly directed locking element 24 with a locking surface 25.

The second locking system of the edges at the short sides is formed by locking parts 26-27, which are situated next to the proximal extremity 28 of the lower hook-shaped portion 18 and the distal extremity 29 of the upper hook-shaped portion 19, respectively. The locking parts 26-27 consist of projections engaging one behind the other, which define locking surfaces 30-31. It is noted that the coupling parts 8-9 principally also may be considered a tongue and groove coupling, wherein the locking part 27 functions as a tongue, whereas the groove in which this tongue gets seated, is defined by the locking part 26 functioning as the upper lip, and the first hook-shaped portion 18 functioning as the lower lip.

It is noted that the space between the vertically active locking part 26 and the horizontally active locking element 21, which is also indicated by opening H, functions as a female part 32, whereas the locking element 24 is made as a male part 33, which fits into the female part 32.

The panel 1 is substantially formed on the basis of soft polyvinyl chloride (PVC). More specifically, it comprises a substrate which is realized on the basis of soft PVC, which substrate is indicated by reference 34 in FIGS. 2 through 13. In these figures, this substrate is schematically depicted as a single layer. In reality, this may be a single layer as well as several layers, which not all have to consist of PVC. Usually, a top layer 35 is provided on the substrate, which in FIGS. 2 to 13 also is represented by a single layer, however, in reality also may consist of several layers, which further will become clear from the description of FIG. 14. The top layer 35 has at least the aim of providing a decorative upper side 36 at the panel 1, preferably in the form of a printed decor and, at least in the case of a floor panel, providing for offering a wear-resistant surface.

As indicated in FIG. 7, the panels have a total thickness T. The thickness T preferably has a value situated between 3 and 10 mm. In particular in a practical embodiment, this value will be situated between 4 and 7 mm.

It is noted that the aforementioned coupling parts, 6-7 as well as 8-9, as represented, preferably are formed integrally from the material of the actual panel 1, more particularly from the substrate material. As a result thereof, the coupling parts as such also consist of soft PVC. It is noted that the coupling parts 6-7 and 8-9 preferably are also formed by means of a mechanical treatment, more particularly milling treatments. Milling techniques which allow to provide coupling parts at the edges of the panels are known, amongst others, from WO 97/47834. By selecting appropriate cutters and by means of an appropriate adjustment thereof, thus, appropriate profiled parts, for example, as are represented in the figures, may be realized.

Preferably, the whole is designed such that, by exerting a relatively low force, preferably manually, at least one of said hook-shaped portions 18-19 can be bent out of the plane of the panel 1, and preferably even both can be bent out of the plane of the panel 1. By this bendability, it is meant that such hook-shaped portion can adopt a bent position in respect to the remainder of such panel 1, wherein this thus may relate to a bending in such hook-shaped portion itself, for example, in the lip thereof, as well as to a bending in the panel itself, proximally from the hook-shaped portion, such that the hook-shaped portion is put at an angle in respect to the panel itself, or to a combination of both. This bendability is achieved, amongst others, due to the suppleness of said soft PVC.

More particularly, it is preferred that at least one of said hook-shaped portions 18-19, in respect to the plane of the panel concerned, can be bent out of this plane, such that the pertaining locking element 21-24 can perform a movement, more particularly a tilting movement, which facilitates coupling the panels. Such bending allows a smooth coupling of such panels by means of an underlay element 37, according to an installation technique which will be explained further in particular.

In FIGS. 8 and 9, it is schematically represented how the panels 1 can be installed. In order to explain the method, a number of the panels 1, in order to differentiate additionally, are indicated by references 1A, 1B, 1C. The panels 1 are laid down row per row and coupled to each other. In order to obtain that the panels are coupled at the edges 2-3 as well as 4-5, the method comprises at least the following steps:

installing a first panel 1A intended for forming part of a first row of panels;

coupling a second panel 1B to said first panel 1A, such at first edges 2-3, wherein this second panel 1B is intended for forming part of a second row successive to said first row of panels;

coupling in the second row a third panel 1C both to said second panel 1B as to the first panel 1A, wherein the third panel 1C is coupled to the first panel 1A by means of a turning movement, wherein the third panel 1C, from an upwardly pivoted position, is brought into substantially the same plane as the first and second panels, whereas, as a result of this movement and the downward movement created therein, the hook-shaped portions 18-19 engage into each other between the third and second panel.

It is clear that normally, between installing the first panel 1A and coupling the second panel 1B thereto, first also all further panels of the row in which the first panel 1A is situated, are installed. Coupling the second panel 1B to the first panel 1A, of course, also is performed by connecting the panel 1B at its edge 2, by means of a turning movement as represented in FIG. 4, to the edge 3 of the first panel 1A and possible other panels of the row of the panel 1A.

When connecting the panel 1C to the panel 1A, also a turning movement, as in FIG. 4, is applied. Herein, a downward movement M is performed at the short edges 4-5, by which the coupling parts 8 and 9 are engaged into each other.

By this downward movement M, in a very broad sense each form of movement is meant in which, in a cross-section as seen in FIGS. 6 and 7, the one panel is let down from a higher position in relation to the other. This movement M does not necessarily have to be a rectilinear movement, and during this movement, temporary deformations in the panels and more particularly in the hook-shaped portions 18 and 19 may occur.

Theoretically, a downward movement M, which, seen in cross-section, is rectilinear or almost rectilinear, may be used for engaging a panel 1C into a panel 1B, which means that the right-hand panel in FIG. 6, seen in cross-section, simply is pressed straight down into the position of FIG. 7. It is clear that herein effectively small local deformations will occur, as the locking parts 26 and 27 have to be pressed home one behind each other by means of a snap effect. Herein, the snap effect is obtained by the elasticity of the soft PVC and the bending actions in the component parts and compressions in the material occurring as a result thereof.

Practically seen, however, use shall be made of a technique described in more detail below, by which the installation of the panels 1 is facilitated. Namely, it is so that, when joining the panels by means of the aforementioned theoretical manner, the hook-shaped portions 18-19 are difficult to press fixedly into each other as the suppleness of soft PVC is too low. Pressing the hook-shaped portions 18-19 fixedly together according to said theoretical manner, in the represented profile normally will be realized only by exerting a force with a tool onto the upper side of the panel to be joined into the other, on the respective edge thereof, for example, by means of a hammer or the like.

Figure 12:
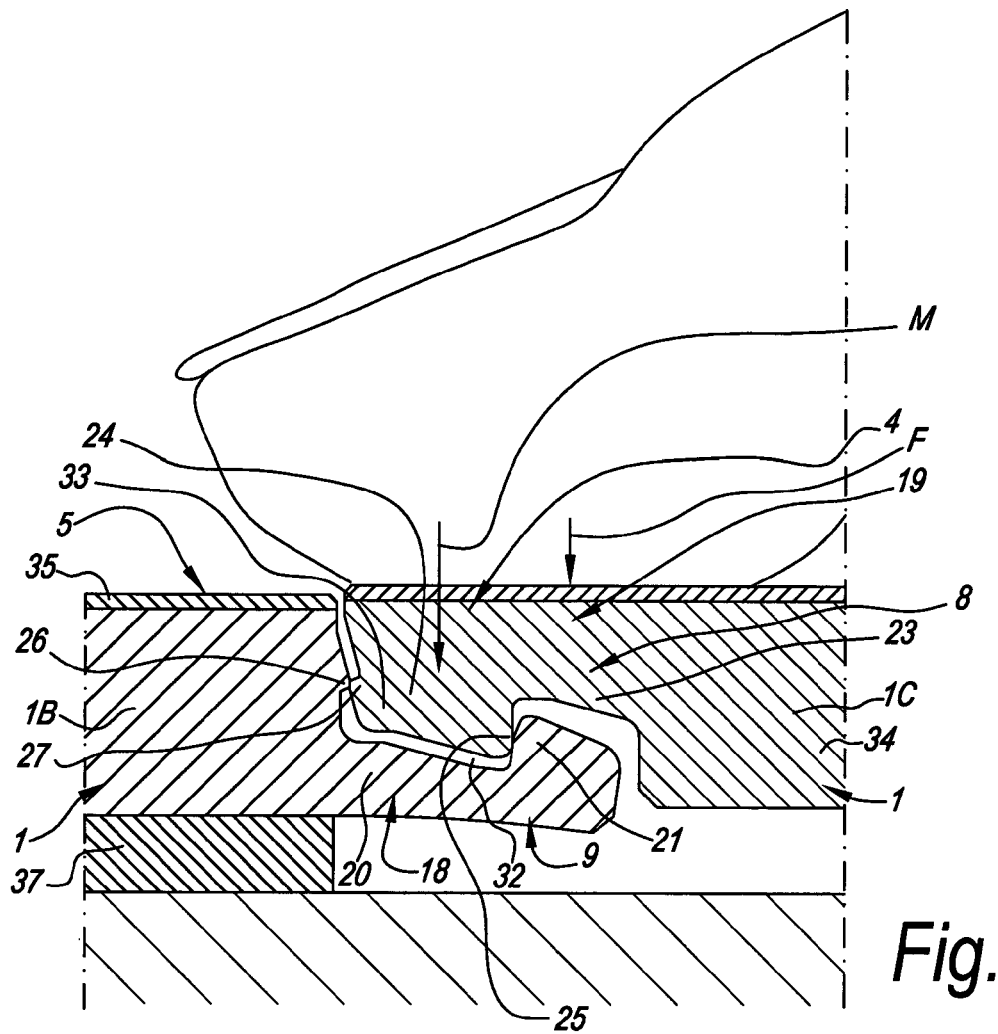

According to a practical technique of the invention, an underlay element 37 is applied when interconnecting the panels 1C and 1B, in such a manner that during joining a bending is created in one or both of the hook-shaped portions 18-19, as a result of which the male part 33 more smoothly fits into the female part 32. Herein, the underlay element 37 is provided underneath the edge 5 of the panel 1B, more particularly is pushed there under, such that the hook-shaped portion 18 is pending freely at a distance above the subsurface, more particularly such as can be seen in FIGS. 12 and 13. By subsequently coupling the panel 1C during turning down to the panel 1B, different movement mechanisms can be created, depending on the location where a pressure is exerted on the panel 1C, which mechanisms, however, always lead to a smooth joining of the edges, without having to exert an extreme force for this purpose. Thus, the pressing-on may take place simply by exerting a force F on the panel 1C with a finger.

Figure 11:
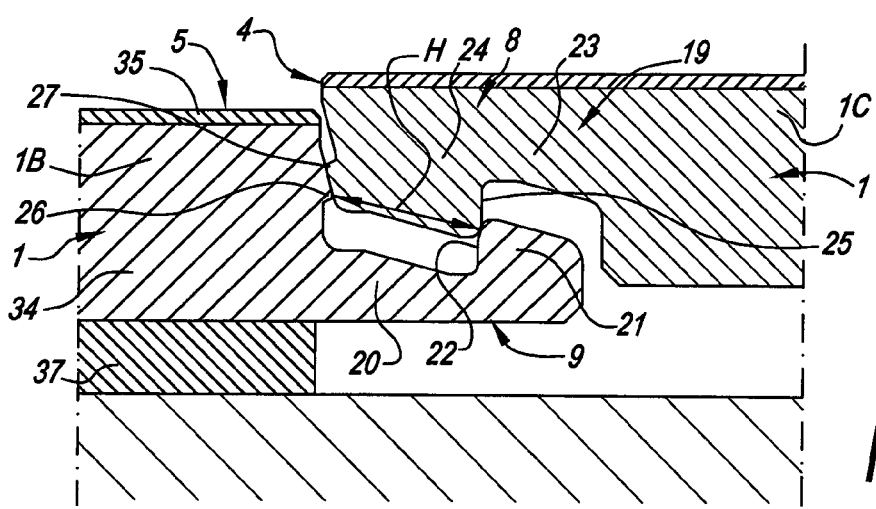
FIG. 11, at a larger scale, represents the portion indicated by F11 in FIG. 10.

According to FIG. 12, the force F is exerted on top of the hook-shaped portion 19, with the result that this hook-shaped portion 19 as such bends not or a little and only the hook-shaped portion 18 bends downward, whereby the opening H indicated in FIG. 11 enlarges a little and the male part 33 will fit better into the female part 32.

However, still better, as represented in FIG. 13, a force F is exerted on the panel 1C at a distance which is somewhat remote from the edge 4, with the result that the entire hook-shaped portion 19 comes into an upwardly bent position in respect to the remainder of the panel. As a result thereof, the locking element 24 performs a tilting movement, by which it fits more smoothly through said opening H, after which, after removing the pressure on the panel 1C, this locking portion 24 tilts back into its normal position, wherein the locking part 27 comes to sit underneath the locking part 26. It is clear that herein normally also a bending in the hook-shaped portion 18 will occur, as a result of which, analogous as discussed by means of FIG. 12, also the joining is facilitated once more.

During joining according to FIG. 13, a snap effect may or may not occur, depending on the design of the coupling parts and the bending effects of the hook-shaped portions 18 and 19 realized during joining. It is clear that by a bending herein a bending in a hook-shaped portion 18 or 19 itself has to be understood, thus, that the lip 20 and/or 23 itself is bent, as well as a bending of such part in its totality, wherein the bending zone is not located in the lip 20 and/or 23, but at a farther distance from the respective edge in the respective panel itself. The bending may also consist of the combination of these two possibilities.

In the most preferred embodiment, the coupling parts 8-9 are realized such that, by realizing a bending as in FIG. 13, however, in a more pronounced form, the male part 33 can be inserted in the female part 32 without any snap effect, this by means of the above-discussed tilting movement. By means of a pronounced bending, the male part 33 effectively can be inserted freely into the opening H, after which this, by the tilting back thereof, it is seated with the locking part 27 underneath the locking part 26 without any snap effect. Such pronounced bending is represented in FIG. 14, wherein said opening is enlarged such that the locking element 24 can move smoothly downward between the locking element 21 and the locking part 26, whether or not with any clamping effect, until the locking surface 31 slides underneath the locking surface 30 and the locking is obtained. It is noted that the technique applied herein results in that the coupling is no longer operative as a so-called "push-lock" coupling, but rather provides for a local turning movement, wherein certain portions thus perform tilting movements into each other by the deformation of the respective edge zones.

An important advantage of the herein-above discussed practical methods consists in that for moving the locking parts 26 and 27 one behind each other, the panel 1C, when being let down, does not have to perform a short to-and-fro shifting movement along the already coupled edge 2, or this shifting movement is strongly minimized. In a number of known so-called "angle-push" or "fold-down" systems, such to-and-fro shifting movement in fact forms a problem, as the new panel, which is already coupled at the longitudinal edges, often does not properly pull itself against the preceding panel in the same row. By the above-described technique, wherein a tilting movement occurs in the edges 4-5 to be coupled, the entire panel, in order to provide the locking parts 26 and 27 one behind the other, does not have to perform a to-and-fro displacement in the longitudinal direction, or this to-and-fro displacement is considerably reduced, by which said problem is excluded, minimized, respectively.

Figure 15:
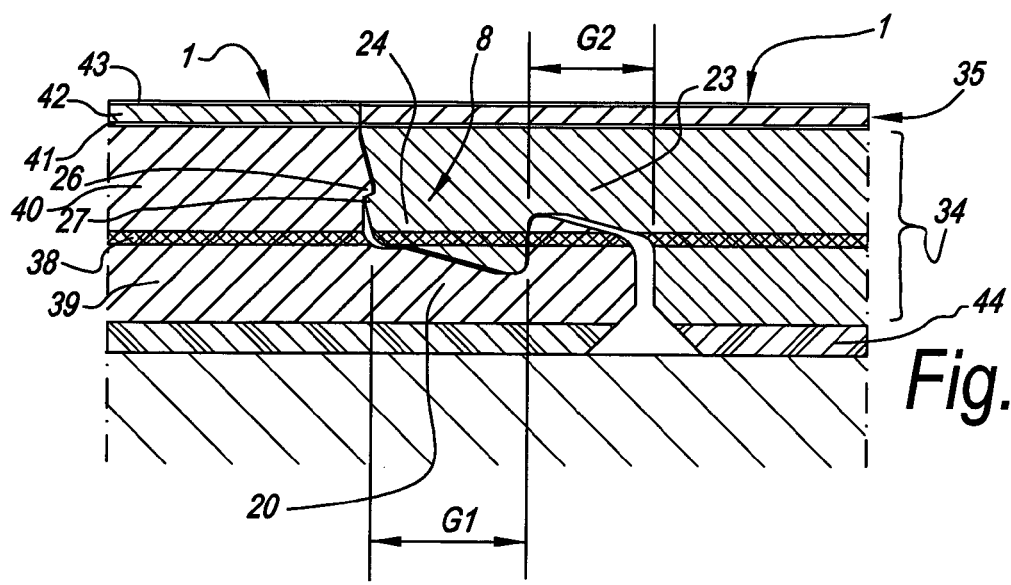
FIG. 15 in cross-section represents another embodiment of a panel according to the invention.
Figure 16:
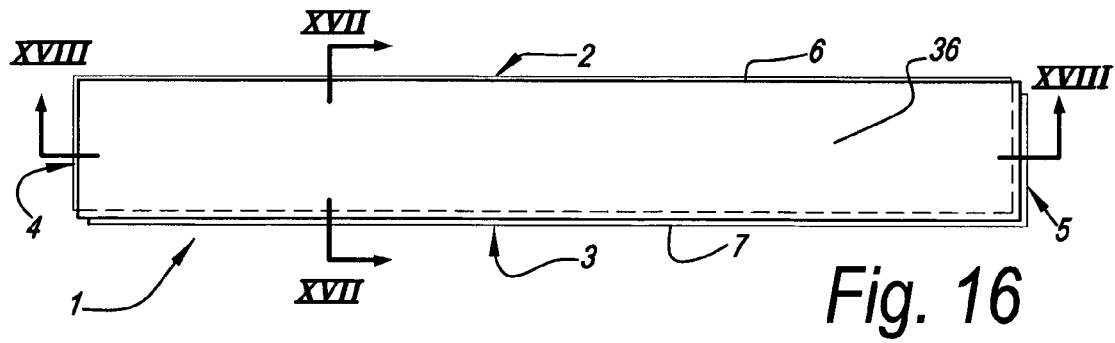
FIG. 16 in top view represents another panel according to the invention.

Finally, in FIG. 15 a particular embodiment of a panel according to the invention is represented, with the particularity that in the substrate 34 a reinforcement layer 38 is provided, preferably of glass fiber, more particularly a net or fleece of glass fiber. An important preferred characteristic herein is that at least one of the lips 20, 23, respectively, and preferably both, comprise a portion G1, G2, respectively, which are free from the reinforcement layer 38, such that a good bendability in the respective lip is maintained.

As an example, FIG. 15, apart from the reinforcement layer 38, also represents a practical construction, which is composed as follows:
- the substrate, which consists of two basic layers 39-40, with the reinforcement layer 38 embedded there between;
- the top layer 35, which is composed of a film 41 printed with a motif, a transparent wear layer 42 and one or more transparent lacquer layers 43;
- at the underside, a backing layer 44.

The basic layers 39 and 40 consist of PVC, possibly recycled PVC, whereas the reinforcement layer 38 consists of a glass fiber net. The printed film 41 consists of a printed PVC film. The transparent wear layer 42 consists of a thin layer of vinyl, in which wear-resistant particles, preferably ceramic particles, such as corundum and the like, are incorporated. The lacquer layers 43 offer an additional protection and preferably are formed of two layers of transparent polyurethane lacquer, in which optionally also wear-resistant particles have been incorporated.

The thicknesses of the layers may differ from manufacturer to manufacturer. In FIG. 15, they are depicted only schematically. In a practical embodiment, these may have, for example, the following thicknesses: 1 mm for the backing layer 44; 2.5 mm for the lower basic layer 37; 0.3 mm for the glass fiber net; 1.5 mm for the upper basic layer 38; 0.1 mm for the printed film 39; 0.5 mm for the wear layer 40; and 0.1 mm for the whole of lacquer layers 41.

Further, impressions can be provided in the surface, in the form of a relief, which, for example, imitates a real surface structure, for example, of wood or the like. This relief can be performed in register with the decor.

Further, it is noted in general that preferably also one or more of the following characteristics are applied:
- the locking part 27 is placed somewhat towards the inside, such that it is situated entirely underneath the upper side of its own panel;
- the locking parts 26-27 forming the second locking system are made in the form of projections, undercuts, respectively.

The present invention is in no way restricted to the embodiments described by way of example and represented in the figures, however, such panel, such covering and such method for installing panels can be realized according to various variants, without leaving the scope of the invention.

For example, a support portion 45 can be provided at the underlay element 37, with which this underlay element 37 can be slid against the front edge of the panel 1B, in order to obtain that the underlay element is situated perpendicularly to the longitudinal direction of the panels. At the front edge 46 possibly a means, such as an inclined part, can be provided, as a result of which the underlay element can be slid smoothly under the already installed panel 1B. It is noted that the underlay element 37 preferably has such a length that it reaches up to underneath the panel 1A.

The panel described below by means of FIGS. 16 to 28, as well as methods for installing and manufacturing it, relate to the seventh to thirteenth aspect of the invention.

In the represented example, the panel 1 is rectangular and oblong and comprises one pair of edges 2-3, which form the long sides of the panel 1, as well as one pair of edges 4-5, which form the short sides. Further, the represented panel 1 comprises a substrate 34, which consists of a material on the basis of soft PVC. Moreover, the panel 1 altogether is relatively supple.

Figure 17:
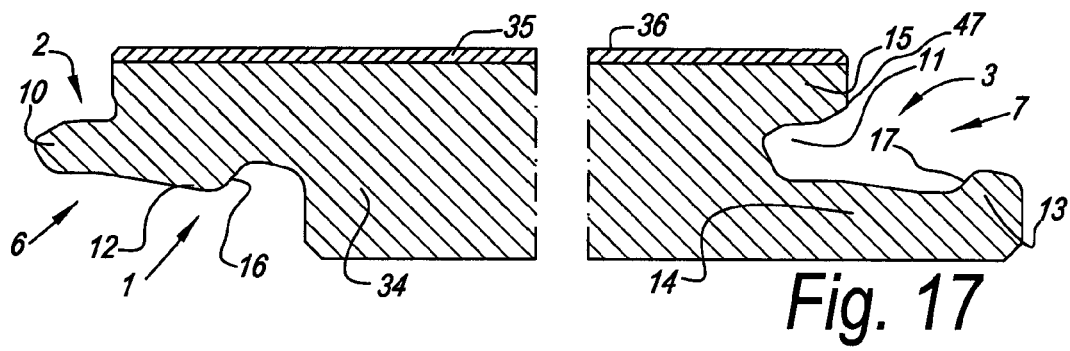
FIGS. 17 and 18, at a larger scale, represent cross-sections according to lines XVII-XVII and XVIII-XVIII, respectively, in FIG. 16.
Figure 18:
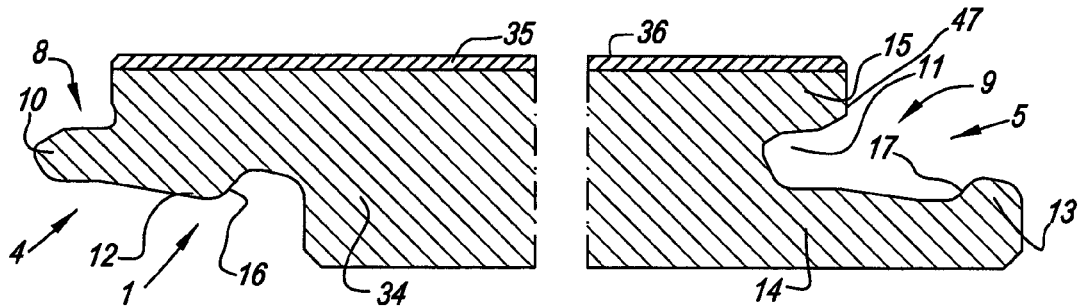
Figure 19:
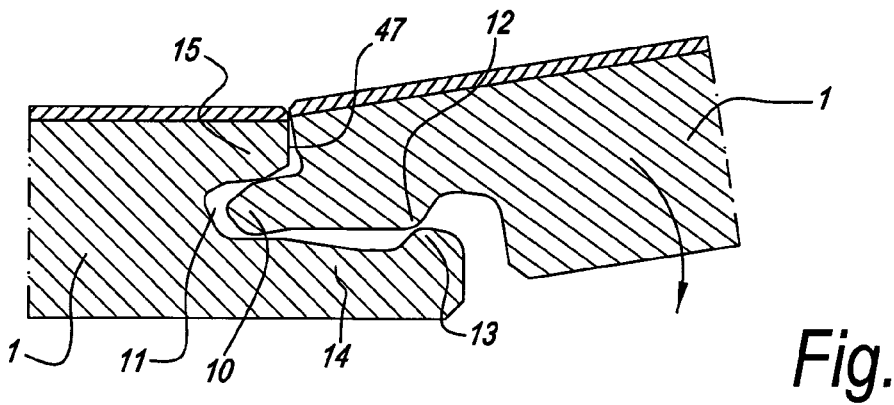
FIG. 19 represents how two panels according to FIG. 16 can be coupled to each other.

As can be seen in FIGS. 17 and 18, at each pair of edges 2-3 and 4-5 coupling parts 6-7, 8-9, respectively, are present, which are formed in the substrate 34 and which, in the coupled condition of two of such panels 1, effect a locking in the vertical as well as in the horizontal direction. Herein, these coupling parts 6-7 and 8-9 at both pairs of edges 2-3 and 4-5 are configured such that two of such panels can be coupled to each other by means of a turning movement, as illustrated in FIG. 19.

In this case, the coupling parts 6-7 and 8-9 consist at both pairs of edges of a tongue 10 and a groove 11, as well as locking parts 12-13, which, in the coupled condition, prevent the drifting apart of the tongue 10 and groove 11. The groove 11 respectively is bordered by a lower lip 14 and an upper lip 15, wherein the lower lip 14 extends laterally up to beyond the distal end 47 of the upper lip 15. The locking parts 12-13 define locking surfaces 16-17. It is noted that in the represented example, the tongue and groove profiles at both pairs of edges 2-3 and 4-5 are identical to each other, which, of course, is no absolute requirement. For simplicity's sake, in the embodiment of FIGS. 16 to 21 thus the same references 10 to 17 are applied for the specific description of the coupling parts 6-7 as well as of the coupling parts 8-9.

The locking surfaces 16-17 are situated at least partially, and, as represented, entirely in the portion of the lower lip which is situated beyond the distal end of the upper lip.

Figure 20:
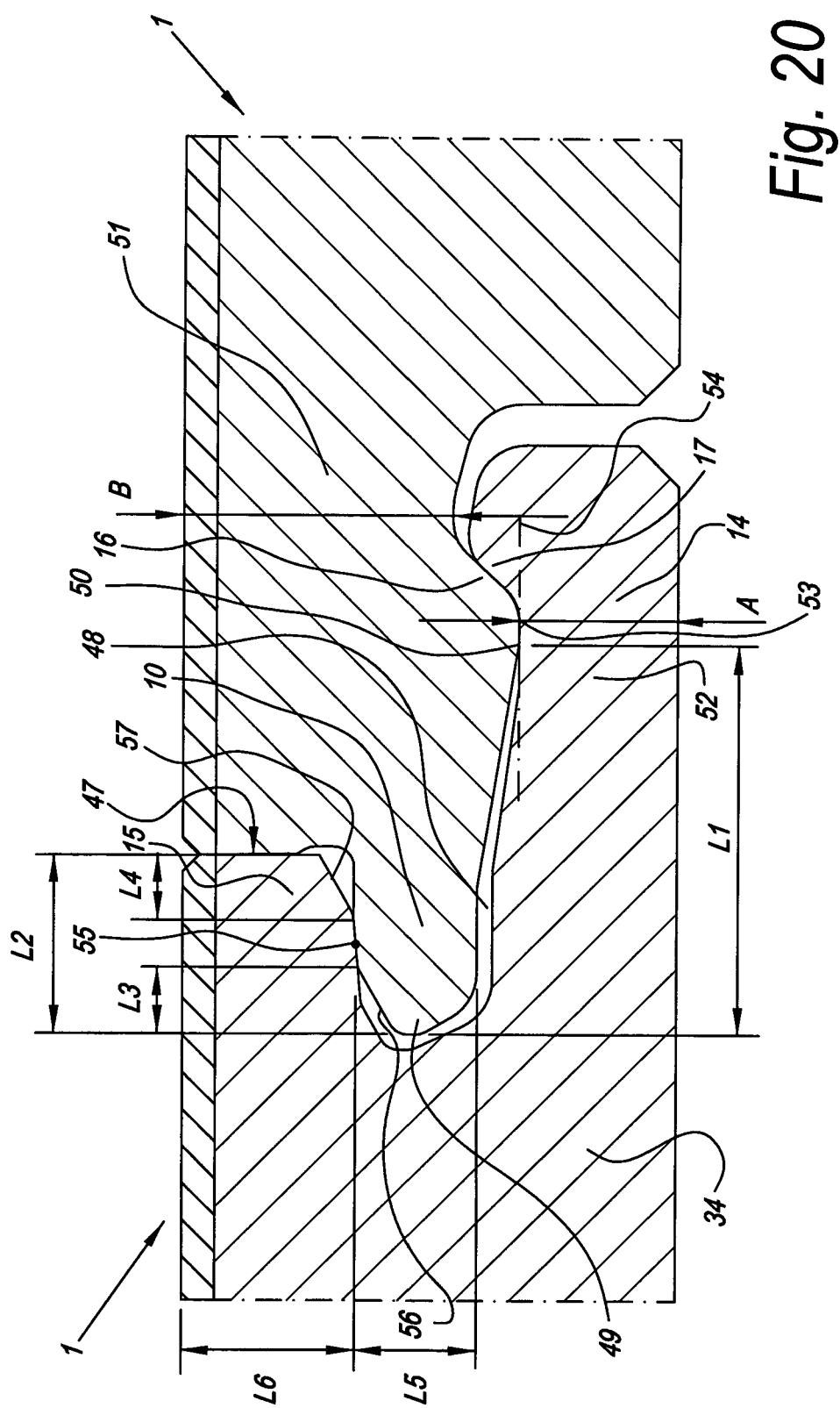
FIG. 20 represents two coupled panels from FIG. 16.

FIG. 20 represents that in the coupled condition of two of such panels 1, a space 48 is present underneath the tongue 10, said space extending continuously underneath the tongue 10 as from the tip of the tongue 10 up to a location 50, which is situated beyond the distal end 47 of the upper lip 15.

Said space 48 extends underneath the tongue 10 over a length L1, measured parallel to the plane of the panel, which preferably is at least 1.5 times, and still better at least 2 times, the distance L2 from the tip 49 of the tongue 10 up to the distal end 47 of the upper lip 15, which effects a smooth insertion of the tongue in the groove and also contributes to that two of such panels can be shifted along their edges in mutual respect.

As represented, the tongue 10 preferably is in connection with the remainder of the panel 1 by means of a narrowed portion 51. The smallest thickness A of the portion 52 of the lower lip 14, which is situated beyond the distal end 47 of the upper lip 15, therein preferably is smaller than the smallest thickness B of said narrowed portion 51. Further, it is preferred that the tongue 10, in downward direction, is supported on the groove by means of the locking surfaces 16 and 17 and/or by means of a support point 53 situated proximally from the locking surface 17.

The support point 53, which also provides for the support in downward direction, preferably has a contact tangent line 54 forming an inclination with the horizontal which is smaller than 30 degrees and still better is smaller than 10 degrees and still better is zero degrees, such as it is the case in FIG. 20.

The fact that apart from the locking surfaces 16 and 17, also a support point 53 is present, guarantees for that the tongue 10 cannot move up and down in the groove and that no height differences can occur among the coupled panels.

FIG. 20 also shows that the contacting portion 55, which is situated at the underside of the upper lip 15, preferably forms a slight downward inclination in proximal direction, which allows working with a slightly downward-inclined milling cutter, which will be explained further in the description of FIG. 28.

As represented, the tongue 10 preferably is beveled or rounded at the upper side, next to the tip 49. The rounded and/or beveled portion 56 preferably extends over a distance L3, which is at least ¼ and still better at least ⅓ of the length L2, as measured according to a direction parallel to the plane of the panels. Also distally from the contacting portion 55, as represented, preferably a beveled and/or rounded portion 57 is present at the underside of the upper lip 15, such over a distance L4, which is at least ⅕ and still better ¼ of said distance L2.

The average thickness L5 of the portion of the tongue 10 situated in coupled condition underneath the contacting portion 55, preferably is less than 1.5 mm in order to keep maximum material thicknesses for the upper lip 15 and lower lip 14 in this manner, which is of importance with vinyl panels, which mostly are relatively thin. Preferably, the tongue 10 is relatively long in relation to its thickness. More particularly, it is preferred that the distance L2 is larger than 1.2 times and still better is larger than 1.3 times the aforementioned thickness L5, by which a positive locking in height direction can be guaranteed.

The lower lip 14 preferably is made relatively stable in relation to the groove structure. More particularly, it is preferred that the distance A, which relates to the thinnest portion of the lower lip 14, is at least 0.7 times the distance L6. Herein, the distance L6 is the average thickness of the upper lip 15 at the location of the contacting portion 55.

Figure 21:
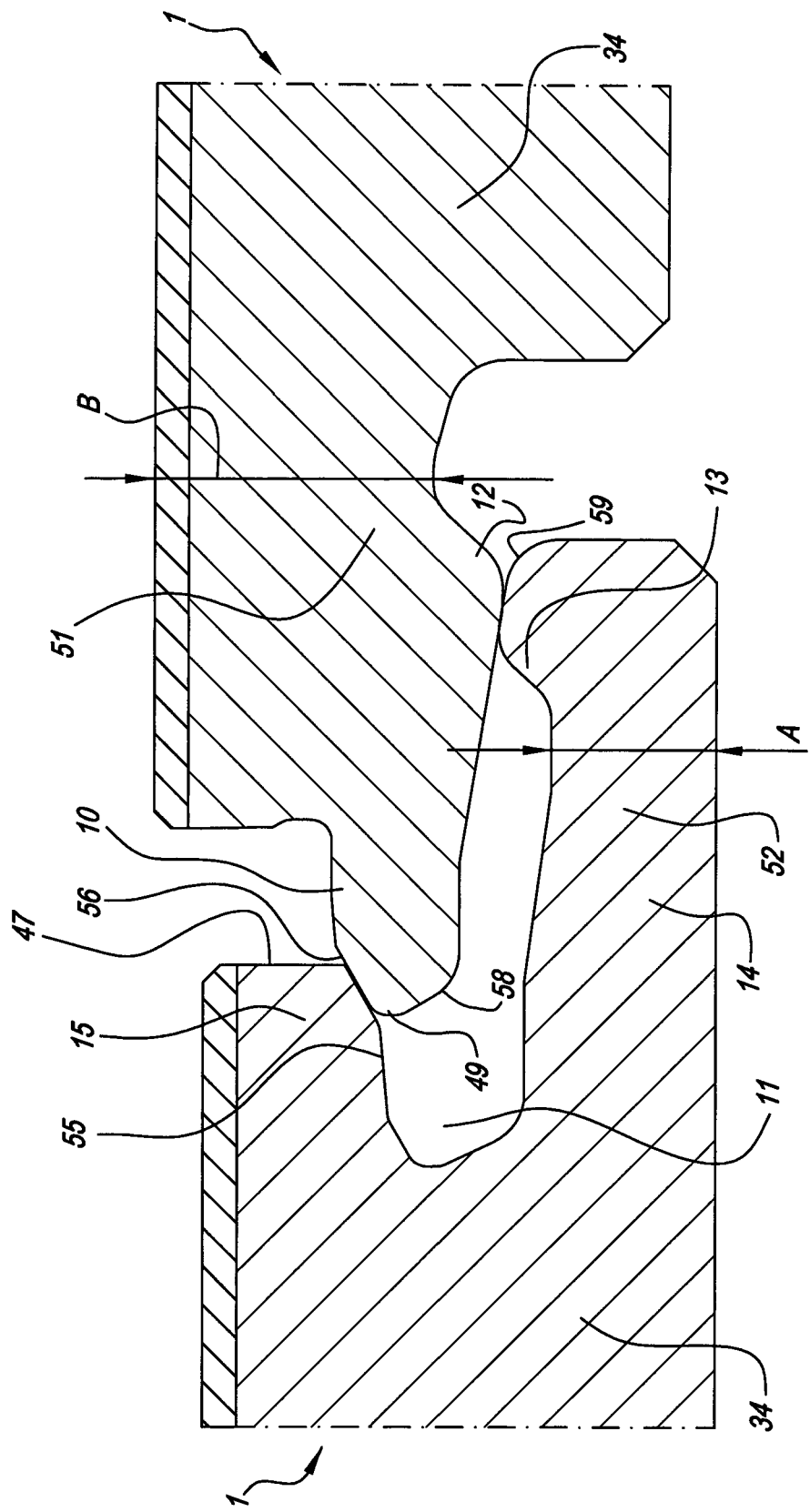
FIG. 21 represents the edges of two panels according to FIG. 16 in a condition wherein they are presented to each other in a plan-parallel manner.

As can be seen in FIG. 21, the tongue and groove are made such that, when two of such panels 1 are presented to each other in a plane-parallel manner at the edges concerned, the tongue 10 comes to sit at least with its tip already at least partially underneath the lip 15 bordering the upper side of the groove 11, without any bending being necessary already. This offers the advantage that the tongue 10, during the installation of the panels 1, almost always automatically ends up in the groove. Further, it is preferred that, due to the elasticity and bendability of the materials, of which the panels are made, two of such panels can also be forced into each other by means of a snap movement. This may be realized, for example, by pushing two of such panels 1 from a mutual position, such as the one from FIG. 21, towards each other. This may also be realized starting from a position in which both panels 1 are situated completely next to each other, and shifting them from this position towards each other. The rounded portions 58 and 59 indicated in FIG. 21 then cooperate with each other and provide for that the tongue 10 then is shifted onto and subsequently over the locking part 13.

It is noted that all partial characteristics described herein above, according to not represented variants of the invention, do not have to be combined in the same embodiment and also do not have to be present at both edges. Each of the described characteristics, ratios and the like thus may occur as such in combination with one of the independent aspects of the invention.

FIGS. 22 to 25 represent how the panels 1 can be installed by means of a "angle-angle technique", which means that the panels are installed by means of a turning technique both at the edges 2-3 and 4-5. Herein, for clarity's sake the panels are indicated by the differentiating references 1D, 1E and 1F.

Figures 22, 23:
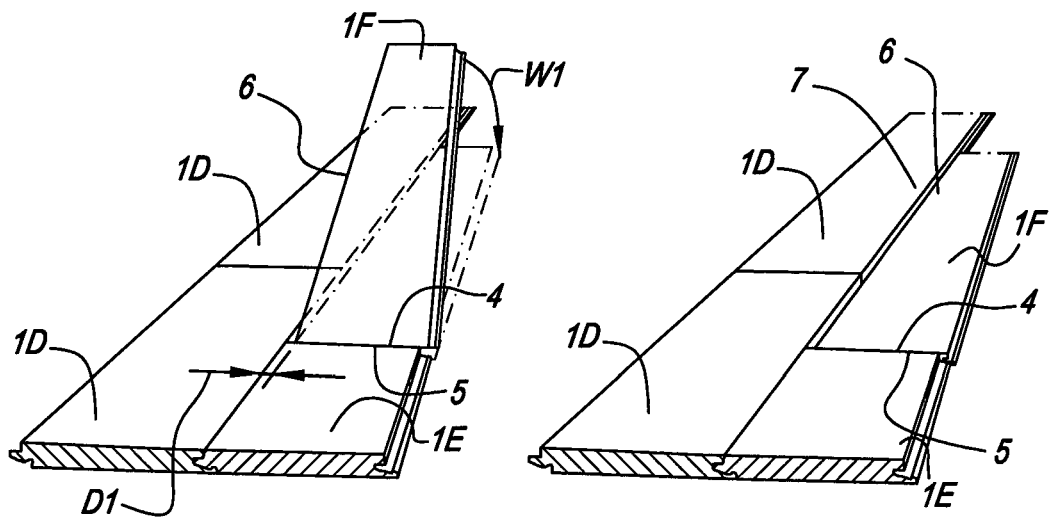

FIG. 22 shows a situation in which panels 1D in the same row already are coupled to each other and, in a second row, already a panel 1E is coupled thereto. The newly to be coupled panel 1F then is coupled to the panel 1E by means of a turning movement W1, wherein this panel 1F in respect to the closest edge of the panels 1D is situated somewhat shifted over a distance D1. The turning movement W1 is a movement analogous to the one represented in FIG. 19.

Figures 24, 25:
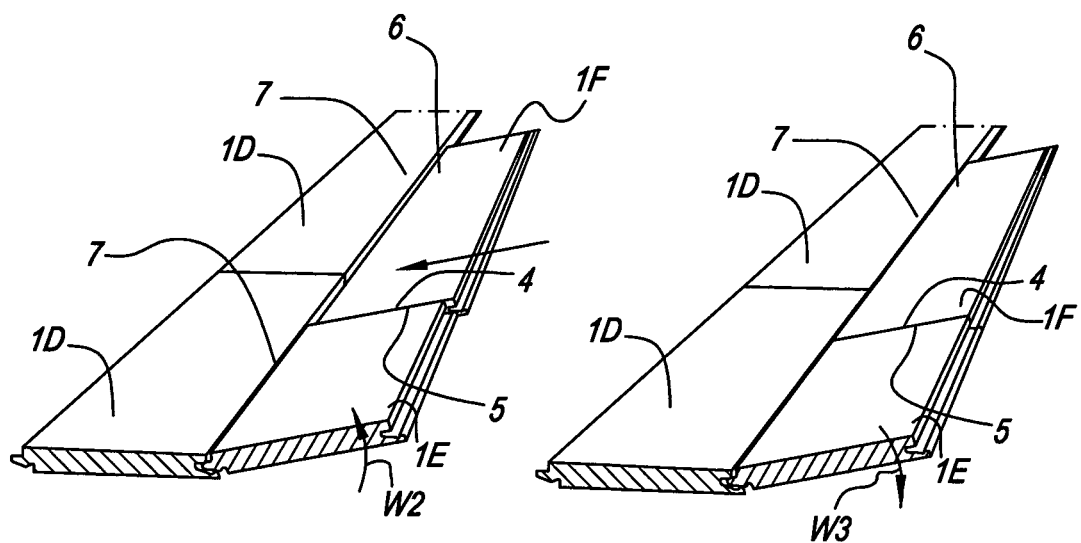

Thereafter, both panels 1E and 1F simultaneously are turned somewhat upward, which turning movement is indicated by W2 in FIG. 24. Subsequently, the panel 1F is shifted with its edge 4 along the edge 5 of the panel 1E, by means of a shifting movement S, until the condition of FIG. 25 is obtained. Due to the presence of said space 48, it is obtained that the tongue 10 during this shifting movement S cannot get stuck in the most rigid portion of the groove, in particular the portion situated underneath the upper lip. In the case of synthetic material, and in particular in the case of soft PVC, otherwise rather fast a clamping effect would arise, which renders installing difficult and even impossible.

As a result of the aforementioned shifting movement S, the panels 1F and 1D come into a position at their cooperating edges, which is analogous to that of FIG. 19. It is clear that the panel 1F can be brought in its completely installed position by turning the panels 1E and 1F then from the position of FIG. 25 simultaneously downward into the flat condition, such by means of the turning movement W3.

By applying a tongue and groove profile allowing a mutual presentation as illustrated in FIG. 21, it is also obtained that with the shifting represented in FIG. 24 the tongue at the edge 6 automatically searches a way into the grooves 11 of the edges 7 of the panels 1D, even when the panels 1E and 1F are lifted up only slightly.

Thus, it is clear that the use of the space 48 is of particular importance at the short sides, whereas a configuration allowing a mutual positioning as in FIG. 21 is particularly useful at the long sides.

FIG. 26 represents a technique, which can replace the steps of FIGS. 22 and 23. Herein, the panel 1E first is turned somewhat upward and in this position the panel 1F is presented with its edge 4 to the edge 5 of panel 1E and is turned in, after which again a condition as in FIG. 24 is obtained.

It is noted that it is preferred that a panel 1 according to the invention is manually bendable in at least one direction in such a manner that it can be inserted, at the edges extending transverse to this direction, with a tongue over the lower lip of a preceding panel into the groove of this preceding panel, until the upper edges touch each other, and without bending of the lower lip of the preceding panel, whereas the respective panel, at the edge situated opposite to the edge having said tongue, is bent down up to the underlying surface. This allows that such panel can be smoothly inserted with the tongue concerned into the groove of a preceding panel. As the panel at the opposite edge can be bent up to the underlying surface, or possibly, under the influence of its own weight, bends down to the underlying surface, the panel can be smoothly aligned in said direction in relation to the already installed panels. In the case of oblong panels, said direction preferably is the longitudinal direction of the panel.

A practical application, wherein said characteristic shows its advantages, is represented in FIG. 27. In FIG. 27, a panel 1F is coupled to the panel 1E, analogous as in FIG. 22, however, the panel 1F thereby is brought or held in a bent condition. In this manner, the tongue of the edge 4 can be inserted in the respective groove of the panel 1E, analogous to FIG. 19, whereas the corner 60 remains on the underlying surface or in the proximity thereof and thereby the panel 1F can be positioned with the corner 60 close to the edge 3 of the panel 1D, by which an alignment in longitudinal direction is obtained, which facilitates the realization of the coupling at the short sides.

According to a deviating variant of the invention, it also relates to panels which are made of synthetic material and in particular on the basis of soft PVC, wherein, as aforementioned, use is made of a space underneath the tongue, however, wherein it is not necessary that coupling parts are present at the other pair of sides, or wherein these coupling parts provide exclusively for a vertical or exclusively for a horizontal locking. Such space also in such application still offers certain advantages, amongst others, of a smooth insertion of the tongue in the groove.

FIG. 28 represents that the groove 11 can be realized, amongst others, by means of a rotating cutting tool 61, such as a milling cutter, which is arranged inclined in respect to the plane of the panel. This allows giving the cutting parts 62 of the cutting tool 61 a larger thickness than in the case of using a cutting tool 61 rotating in the plane of the panel. This is of particular importance with thin panels, for example, with a thickness of less than 5 mm, in order to thus still be able to give the cutting parts 62 a proper thickness, which thickness D2 then is at least 1.4 mm. Towards the underside of the panels, the cutting parts 62 may remove more material, as here then the space 48 has to be realized. It is noted that the panel here is represented upright, however, that in a real milling process, the panel mostly is lying upside down on a support surface.

Finally, it is noted that the panels above substantially are described as floor panels. A certain terminology refers to the position taken by a panel when applied as flooring. However, it is clear that with an application in wall or ceiling panels, this terminology has to be interpreted in an adapted manner. A lower hook-shaped portion then has to be seen as a hook-shaped portion situated against the rear side. An upwardly directed locking element then has to be seen as a locking element extending in the direction from the rear side to the decorative side. A downward movement then forms the movement by which one panel is moved with its rear side towards the plane in which the covering has to be realized.

Also, it is noted again that there, where soft PVC is mentioned, according to an alternative pertaining to the invention, also other synthetic materials can be applied, which have a similar suppleness as soft vinyl or LVT tiles. It is also clear that the substrates intended in the application can consist of a plurality of layers, amongst which also such of other materials, as, for example, reinforcement layers.

Further, it is clear that when using them as floor panels, these panels can be installed floatingly, which, however, does not exclude that, according to an alternative, they can be glued to the underlying surface, as well.

The invention claimed is:
1. A floor panel for forming a floor covering;
wherein the panel comprises a substrate of a material on the basis of soft PVC;
wherein the panel is rectangular, either oblong or square, and comprises a first pair of opposite edges and a second pair of opposite edges;
wherein both pairs of opposite edges comprise coupling parts allowing to couple a plurality of such panels to each other;
wherein the coupling parts, at both pairs of edges, form a first locking system effecting a locking in the plane of the panels and perpendicular to the respective edges, and form a second locking system effecting a locking transverse to the plane of the panels;

wherein the coupling parts, at least at one of said two pairs of edges, substantially are realized from said substrate and in one piece of said material on the basis of soft PVC;

wherein the coupling parts, at least at said one of said two pairs of edges, consist of a tongue and a groove, as well as locking parts, which, in the coupled condition, prevent the drifting apart of the tongue and groove, said locking parts defining cooperating locking surfaces;

wherein said groove is bordered by a lower lip and an upper lip, wherein the lower lip extends laterally up to beyond the distal end of the upper lip and wherein the lower lip comprises one of said cooperating locking surfaces;

wherein said tongue and groove have a shape which provides for that, in the coupled condition of two of such panels, a space is present underneath the tongue, said space extending from the tip of the tongue continuously underneath the tongue up to a location situated beyond the distal end of the upper lip, said location measured in horizontal direction being closer to said locking surface at said lower lip than to the distal end of the upper lip;

wherein a contacting portion at the underside of the upper lip, which, in the coupled condition of two of such panels, cooperates with the upper side of the tongue at the respective opposite edge, forms a downward inclination, more particularly a slight downward inclination, in proximal direction; and wherein in the coupled condition said lower lip located distally from the corresponding locking surface is free from vertically active support surfaces.

2. The floor panel of claim 1, wherein the tongue and groove, including the locking parts, are arranged for allowing interconnecting two of such panels at the respective edges by means of a turning movement.

3. The floor panel of claim 2, wherein, when two of such floor panels, at the respective edges, are presented to each other in a plane-parallel manner, the tongue, at least with its tip, already comes to sit at least partially underneath the lip bordering the upper side of the groove, without any bending being necessary already.

4. The floor panel of claim 3, wherein the tongue is beveled or rounded at its upper side, next to the tip; and wherein, distally from the contacting portion, a beveled and/or rounded portion is present at the underside of the upper lip.

5. The floor panel of claim 1, wherein the distance from the tip of the tongue up to the distal end of the upper lip, is larger than 1.2 times and still better is larger than 1.3 times the average thickness of the portion of the tongue situated in coupled condition underneath said contacting portion at the underside of the upper lip.

6. The floor panel of claim 1, wherein the smallest thickness of the portion of the lower lip situated beyond the distal end of the upper lip, is at least 0.7 times the average thickness of the upper lip at the location of said contacting portion at the underside of the upper lip.

7. A floor panel for forming a floor covering;
wherein the panel comprises a substrate of a material on the basis of synthetic material;
wherein the panel is rectangular, either oblong or square, and comprises a first pair of opposite edges and a second pair of opposite edges;

wherein both pairs of opposite edges comprise coupling parts allowing to couple a plurality of such panels to each other;

wherein the coupling parts, at both pairs of edges, form a first locking system effecting a locking in the plane of the panels and perpendicular to the respective edges, as well as form a second locking system effecting a locking transverse to the plane of the panels;

wherein the coupling parts at least at one of said two pairs of edges substantially are realized from said substrate;

wherein said coupling parts, at least at said one of said two pairs of edges, consist of a tongue and a groove, as well as locking parts, which, in the coupled condition, prevent the drifting apart of the tongue and groove;

wherein said groove is bordered by a lower lip and an upper lip, whereby the lower lip extends laterally up to beyond the distal end of the upper lip;

wherein said tongue and groove have a shape which provides for that, in the coupled condition of two of such panels, a space is present underneath the tongue, said space extending from the tip of the tongue continuously underneath the tongue at least up to a location situated beyond the distal end of the upper lip;

wherein a contacting portion at the underside of the upper lip, which, in coupled condition of two of such panels, cooperates with the upper side of the tongue at the respective opposite edge, forms a downward inclination, more particularly a slight downward inclination, in proximal direction;

wherein the tongue is in connection with the remainder of the panel by means of a narrowed portion;

wherein the smallest vertical thickness of the portion of the lower lip situated beyond the distal end of the upper lip, is smaller than the smallest vertical thickness of said narrowed portion; and wherein the tongue, in downward direction, is supported on the groove by means of the locking surfaces and/or by means of a support point situated proximally from the locking surfaces.

8. The floor panel of claim 7, wherein the tongue and groove, including the locking parts, are arranged for allowing interconnecting two of such panels at the respective edges by means of a turning movement.

9. The floor panel of claim 8, wherein said tongue and groove are realized such that, when two of such panels, at the respective edges, are presented to each other in a plane-parallel manner, the tongue, at least with its tip, already comes to sit at least partially underneath the lip bordering the upper side of the groove, without any bending being necessary already.

10. The floor panel of claim 9, wherein the tongue is beveled or rounded at its upper side, next to the tip; and wherein, distally from the contacting portion, a beveled and/or rounded portion is present at the underside of the upper lip.

11. The floor panel of claim 7, wherein the distance from the tip of the tongue up to the distal end of the upper lip, is larger than 1.2 times the average thickness of the portion of the tongue situated in coupled condition underneath said contacting portion at the underside of the upper lip.

12. The floor panel of claim 7, wherein the smallest vertical thickness of the portion of the lower lip situated beyond the distal end of the upper lip, is at least 0.7 times the average thickness of the upper lip at the location of said contacting portion at the underside of the upper lip.

* * * * *